United States Patent [19]

Ogden et al.

[11] Patent Number: 4,566,061

[45] Date of Patent: Jan. 21, 1986

[54] METHOD AND MEANS OF MANUAL INPUT OF PROGRAMS INTO INDUSTRIAL PROCESS PROGRAMMABLE CONTROLLER SYSTEMS

[76] Inventors: Ralph Ogden, 1304 Fisher St., Munster, Ind. 46321; Patrick H. Eich, 954 Cypress Point Dr., Crown Point, Ind. 46307

[21] Appl. No.: 532,316

[22] Filed: Sep. 15, 1983

[51] Int. Cl.$^4$ .................... G06K 21/00; G06C 15/00
[52] U.S. Cl. .................... 364/146; 364/181; 364/189; 364/191
[58] Field of Search ............... 364/146, 171, 181, 188, 364/189, 191, 192

[56] References Cited

U.S. PATENT DOCUMENTS

| | | | |
|---|---|---|---|
| 4,195,773 | 4/1980 | Ogden | 235/495 |
| 4,281,379 | 7/1981 | Austin | 364/171 X |
| 4,293,915 | 10/1981 | Carpenter et al. | 364/145 X |
| 4,347,416 | 8/1982 | Ogden | 200/317 |
| 4,371,922 | 2/1983 | Fujita et al. | 364/146 X |
| 4,404,625 | 9/1983 | Saito et al. | 364/146 X |

*Primary Examiner*—Jerry Smith
*Assistant Examiner*—Allen MacDonald
*Attorney, Agent, or Firm*—McWilliams, Mann, Zummer and Sweeney

[57] ABSTRACT

A control and program input arrangement for industrial process programmable controllers, and specifically for the controller microprocessor that provides manually operated mode operation and user programming controls that avoid the need for a coded terminal for user desired program entrying or modification, which arrangement comprises a control panel assembly including a master control panel section and associated status control panel sections, and manually operated keyboards associated therewith, that provide for manually effected shifting of the processor between tape reading, automatic operation, and manual operation modes, as well as for manual effectation of entry of programs into the programmable controller system memory at specific sites or slots of the memory map, checking of the accuracy of such entries, revision of such entries or previously made entries, and cancellation of same, without requiring use of the tape and tape reader components and associated parts of the system.

21 Claims, 10 Drawing Figures

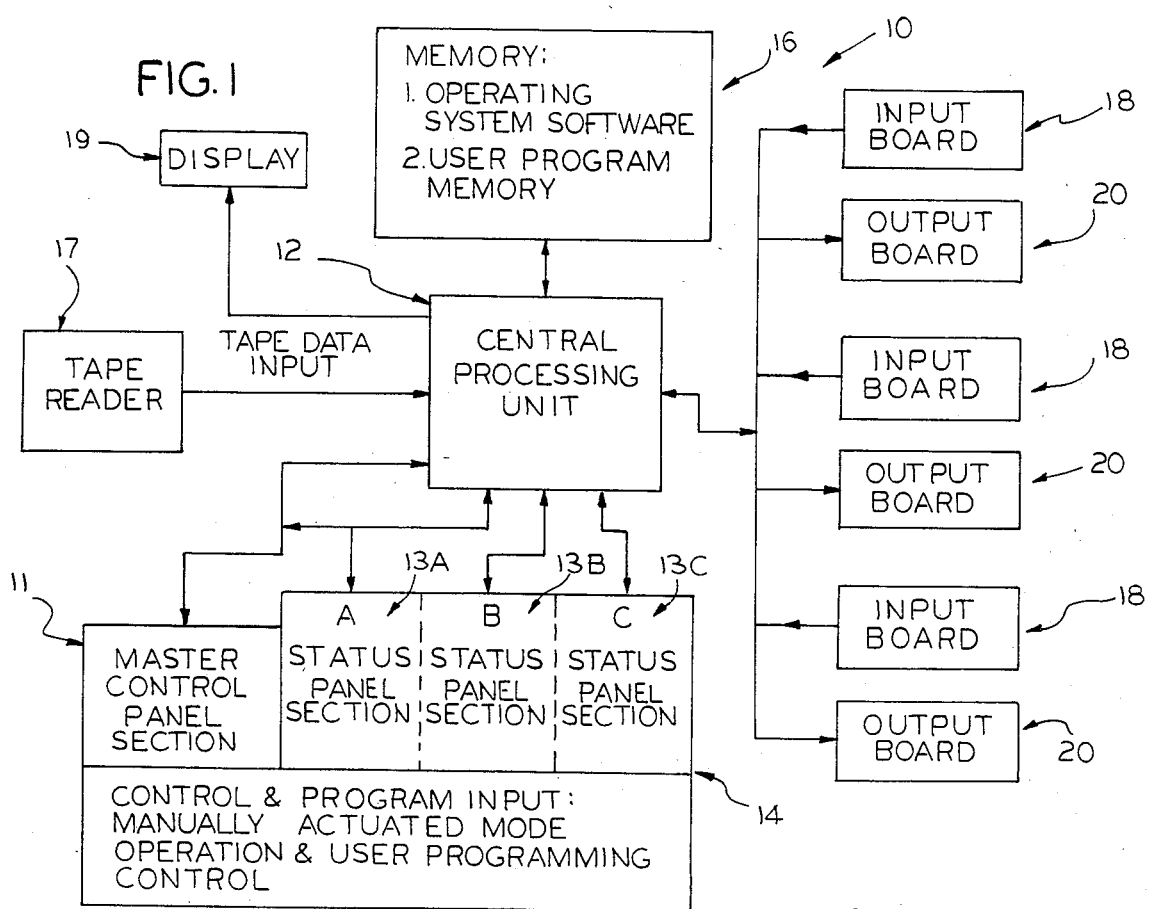
FIG. 1
FIG. 2
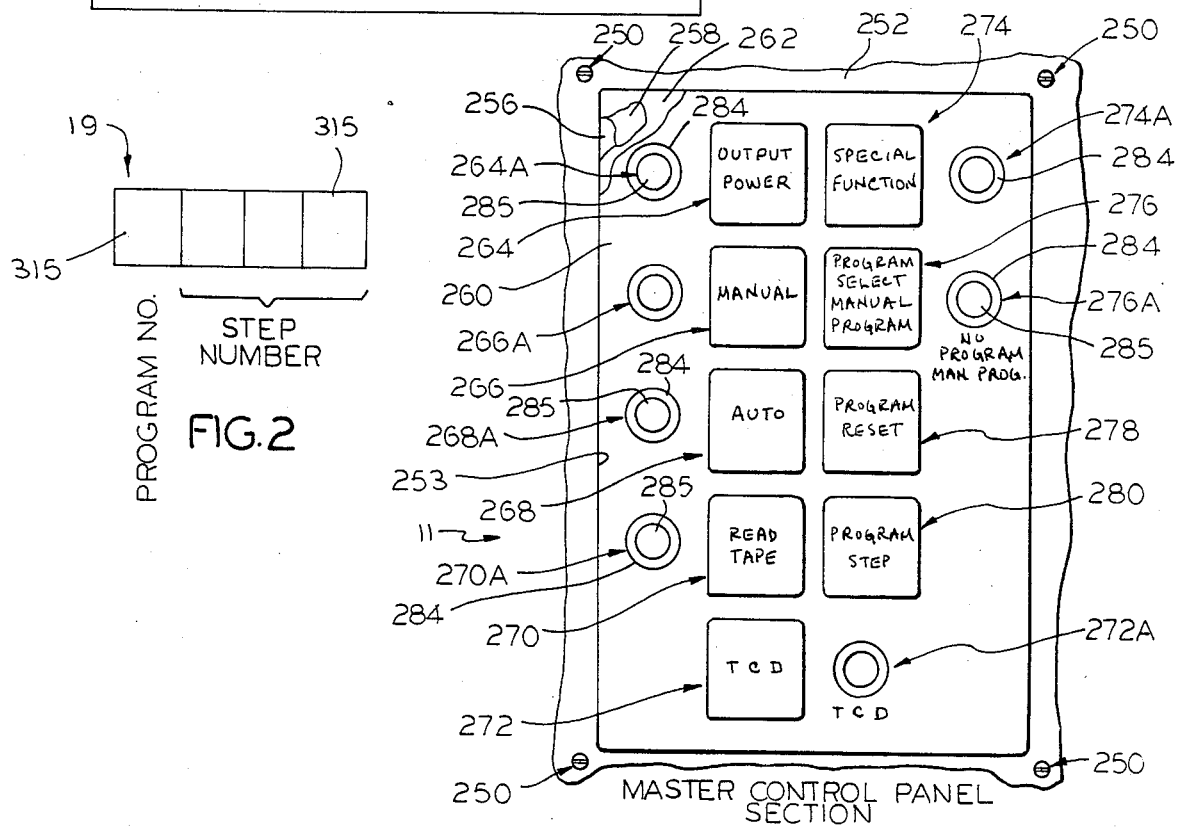
FIG. 3

FIG.8

| | 0 | 1 | 2 | 3 | 4 | 5 | 6 | 7 |
|---|---|---|---|---|---|---|---|---|
| 0 | TCD 1 | TCD 2 | TCD 3 | | | | | |
| 1 | | | | | | | | TCD 16 |
| 2 | A1 | A2 | A3 | | | | | |
| 3 | | | | | | | | A16 |
| 4 | B1 | B2 | B3 | | | | | |
| 5 | | | | | | | | B16 |
| 6 | C1 | C2 | C3 | | | | | |
| 7 | | | | | | | | C16 |
| 8 | TCD 1 | TCD 2 | TCD 3 | | | | | |
| 9 | | | | | | | | TCD 16 |
| 10 | A1 | A2 | A3 | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |

BYTE ADDRESS

STEP #1, STEP #2, STEP #3

METHOD AND MEANS OF MANUAL INPUT OF PROGRAMS INTO INDUSTRIAL PROCESS PROGRAMMABLE CONTROLLER SYSTEMS

This invention relates to programmable controllers, and more particularly, to apparatus of this type for controlling the operation of industrial processing equipment, and methods, means and procedures for effecting manual user program input into the system memory in bypassing relation to, or as an alternate to, a terminal and/or tape reading facilities that the system may have to effect entry into the system memory of programs.

Programmable controllers have come into common use in recent years as a manner of expeditiously controlling the operation of industrial processing equipment, without having to use additional electro-mechanical relay logic circuitry that was commonly use in older forms of industrial process control systems.

A typical programmable controller comprises one or more input modules, one or more output modules, one or more memory modules, and a processor, usually referred to as the central processing unit. The input module converts the status condition of the process variables into electrical signals that can be acted upon by the programmable controller. The output modules convert the commands as issued by the central processing unit into signals that can actuate or deactuate corresponding machine devices. The output modules usually consist of solid state switches operated through the output interface to control power to the desired external devices. The memory modules contain the instructions that represent the system's control circuitry, and the action that is to be taken in response to each condition of the input devices. The central processing unit supervises the other sections of the system. The processor is conventionally operated from a suitable and conveniently located control panel that is labeled or otherwise marked to identify the components controlled thereby.

The control processing unit typically performs logical comparisons on the inputs and outputs in response to instructions in its memory, and it energizes or deenergizes outputs as a result of these comparisons. Modern control processing units typically are of LSI (large scale integration) design contained on one or more printed circuit boards along with additional supporting electronic devices and circuitry. LSI devices are now arranged in extremely small size to perform the functions of the central processing unit, and have become generally known as microprocessors which are commonly contained in or are made up of one or more IC (integrated circuit) chips.

Ogden U.S. Pat. No. 4,195,773, granted Apr. 1, 1980 provides a programmable controller system, apparatus and method for controlling industrial processes that includes a central processing unit provided with a random access and read only memory including an instruction register, a tape reader for sensing computer data bits on a tape specifically arranged to practice the invention, which tape reader is connected to the processing unit for storing the data bits in the memory register and means for connecting I/O devices to the processing unit. The invention of said patent contemplates that as a basic programming tool, a programming work sheet is employed for organizing the needed information as to I/O functions and process steps into computer word arrangement for ready application of such information to the tape and corresponding entry of the information into the system memory employing the tape reader. The work sheet is arranged for manual marking of the program process steps in terms of I/O functions, and timing, counting, and decision functions, in sequentially consecutive binary notation fashion computer data work form, in the order of sequence of the process steps. The tape of said system is a ribbon that is delineated to have applied to same the work sheet computer data word indicia in modularized group or set form, in which the groups or sets of the computer data words for the consecutive process steps are sequentially arranged transversely of the tape, with succeeding groups or sets following in sequential order on the tape, and all such step groups being computer data word indicia marked in the same binary notation system fashion in which the work sheet is marked.

The tape reader and tape of the system are arranged for manual pull through application of the tape through the reader and for sensing of the tape markings in consecutive computer word group or set form, with continuous manually induced movement of the tape through the reader, for storing of the computer word sets in the controller system memory for controlling the process through the controller central processing unit.

As indicated, it is common practice in this field to provide the programmable controller control panel with some means of identifying the components controlled thereby (the controls involved being switches). As the correlation between a particular assembly of controlling switches and the functioning of the individual components controlled that is to be performed is not ordinarily possible in equipment of this type until an installation of the controller is completed, prelabeling or premarking of the control panel legend is likewise not possible.

Ogden U.S. Pat. No. 4,347,416 discloses a control panel arrangement of the membrane or keyboard switch type, that is preferred for the practice of the present invention, which the control panel arrangement involved includes a membrane or keyboard switch control panel system that includes, for each control panel involved, a membrane switch control panel assembly that includes a circuit board having circuitry integrating a predetermined number of control input and output switches including, for each controlling switch, a pair of contacts on one side of the board to be manually closed, membrane switch fashion, and a glow bulb or the like (such as a suitable LED) connected for illumination through an aperture of the board when the circuit board is energized, a membrane sheet of flexible non-metallic material, such as mylar polyester, a polycarbonate, or the like, coextensive with and overlying said one side of the circuit board, with one side of the membrane sheet engaging the said adjacent board side and with the membrane sheet being formed to define apertures aligned with each set of switch contact pairs and having secured over each of its said pairs on the other side of the membrane sheet a planar electrically conductive switch contact closing member of film thickness dimensions for manual (by touch) closing of the aperture exposed switch contacts. Next to the membrane sheet is a legend sheet formed from a flexible non-metallic material such as mylar that is coextensive with and overlies the side of the membrane sheet bearing the switch contact closing member. As disclosed in said U.S. Pat. No. 4,347,416, the legend sheet of the control panel bears switch number indicia imprinted on same for the respective controlling switches in alignment with the contacts of that switch that are to be closed by the touch system employed, and the indicated switch number indicia also serves as the switch location indicia. This basic membrane or keyboard type switch control assembly is integrated with the control panel itself which is ordinarily in the form of a rigid metal sheet that is apertured to define a window opening for viewing the indicia providing portions of the legend sheet.

My said U.S. Pat. No. 4,347,416 discloses a particular orientation of the switching system components involved, and provides for a label assembly that is especially adapted for in-field application of the switch identification indicia to the control panel legend sheet. When the controller apparatus involved, and especially its switching control, has been assembled, the correlation between the separate switches and circuiting controlled thereby is then known, the corresponding information can be applied to the individual labels of the label assembly, after which the individual labels are separated from the assembly and applied to the legend sheet for identifying the functions of the individual switchs involved, in performing the steps of the methods of the various programs that are involved in the operation of the controller apparatus.

The disclosures of said Ogden U.S. Pat. Nos. 4,195,773 and 4,347,416 are hereby incorporated herein in their entireties by this reference.

The present invention is concerned with the provision, at or on the processor control panel, of a manually actuated (by the equipment user) central processing unit mode and mode phase operation, and user programming controls, that comprise a master control panel section and associated status panel sections that are of the membrane or keyboard switch type and that provide for manual push button or key operation of same for ready shifting of the processor between tape reading, automatic and manual operation modes, and manual operation of the keyboard or membrane switch control assemblies involved to enter user programs into the controller system memory and at specific slots or sites thereof, the checking of the accuracy of such entries, the revising of such entries, and the cancelling of part or all of same, without requiring the conventional terminal for program entry or use of the tape and tape reader components of the system, or even requiring their presence as part of an installed system of this type, and permitting the operation of the process controller equipment by personnel who do not have special programming experience or training.

A principal object of the present invention is to provide improvements in the programmable controller system of said patents whereby a program that has been entered on the program work sheet may be entered into the controller system memory using a manual programming input procedure and apparatus or device in association with the control panel of the controller which is in the nature of user manually actuated microprocessor mode and mode phase operation and user programming controls which are organized into a master control panel section and one or more status control panel control sections that preferably are of a keyboard or membrane switch type (such as the general arrangements disclosed in my said U.S. Pat. No. 4,347,416) whereby manual finger actuated push button control is made available to the system operator by way of control panel section push keys to shift the controller as needed between its various modes and mode phases, including tape reading program entry purposes, automatic operation through specific programs, stepping of the controller through selected programs entered in memory, and manual operation of the controller, wherein the master control panel section and the status panel sections of the controller control panel may be used in effect as a manually actuated terminal for entering programs into memory, and modifying and/or erasing part or all of same.

Another principal object of the invention is to provide a master control panel section and one or more status panel sections, in the control panel arrangement for the microprocessor of programmable controller systems of the type disclosed in my said patents, by which the using operator may, by finger actuating push button control procedures, set the controller in its manual program mode, and enter into memory a program applied to one of the system work sheets, by effecting lighting of the status panel section lighting indicators for the respective steps of the program in accordance with the I/O function indicating, binary notation fashion markings, on the system work sheet for each step, or by directly entering the program into the system where the operator, by reason of his knowledge of the I/O functions involved, or otherwise, does not need to use the system work sheet to enter the program.

Another principal object of the invention is to provide for manual programming input entry of programs outlined on the work sheet directly from and in terms of the computer word sets of the work sheet that define the program individual steps in computer word, binary notation fashion, into the controller system memory, in a way that permits erasure of existing programs (that may no longer be needed), and subsequent checking and/or revision of the program or any of its steps, without requiring application of such indicia to the tape (for tape reading into memory) and also accommodating as well, time, counting, and decision functions of any program step, that may be indicated on the work sheet for the particular program in question.

Yet other objects of the invention are to increase the flexibility of the programming equipment disclosed in my said patents, to provide programming methods and procedures that not only are easy to use in practice, but also require no special training or experience to use with facility, and that provide a programmable controller programming system that is readily adapted for use in connection with a wide variety of industrial processing equipment, that is compatible with the basic types of micro processors employed in equipment of this type, and that is oriented and arranged to achieve ready manual input incorporation of programs into memory, adequate checking of same, and full control of the industrial processing equipment involved in performing such programs, in either automatic or manual stepping modes.

In accordance with the invention, the basic programmable controller system is arranged in a manner similar to the disclosures of said two above identified Ogden patents with the circuit means for operatively connecting the microprocessor mode and mode phase controls and the process I/O devices involved to the microprocessor comprising a control panel that includues a master control panel section including a keyboard and associated switches for manually setting the processor to operate in, for instance, manual, automatic, and tape reading modes and mode phases, with LEDs or the like preferably being provided for visual indication for indicating when the circuiting involved in each case is energized, and including one or more status panel sections each equipped with keyboards, associated switches, and LEDs or the like for each switch for visually indicating when the circuit controls by the switch in question are energized, with the switch actuating keys of the latter providing means for manually actuating the individual I/O function controlling switches to set same corresponding to the I/O functions appearing on the work sheet for the particular processing program in question. The memory register of the system, following disclosure of my said U.S. Pat. No. 4,195,773 has a memory map for accepting a predetermined number of the programs which in accordance with standard practices may be designated by individual program numbers that are made a part of the operating system software that retrieves the individual programs as needed.

The system of the present application also contemplates that the master control keyboard panel section includes, in addition to the manual, automatic and other mode and mode phase providing push button keys therefor, a program select key and associated switch and circuitry for locating a desired program (for alteration or entry purposes) in the memory map when the controller is in its manual mode, a special function key and associated circuitry and switching therefor for conditioning the controller to be set in a manual programming mode for manual program changing of program entries in the controller memory register, a manual programming key and associated circuitry and switching for manually changing such program when the controller is in its indicated special function mode, and a program step key and associated circuitry and switching for setting the controller to accept into its memory register in a step by step manner, program revisions, or the predetermined program outlined on the work sheet (in the indicated manner), via the status panel section keyboard and switches controlled thereby in correlation with the program individual method steps, provided computer word fashion on the work sheet, and appropriately advancing such program. Also provided are a program reset key and associated circuiting and switching for resetting the program at zero step when the controller is in its manual mode. The system also includes means for displaying the program and step identities of the programs in memory, and means for the advancing of any selected program, step by step in consecutive order, for reviewing visually on the LED's of the status panel sections, the status of the program I/O functions entered into the memory register for each such program step, with provision for changing one or more I/O functions for each step. The system is also arranged to permit ready entry into memory of user programs without having to use the system work sheet.

In accordance with the method aspects of the invention, a predetermined program as outlined on the work sheet is entered into the controller memory register, without requiring use of either the tape or the tape reader, by using the master control keyboard panel section control keys to place the controller in its manual mode, and then adjusting the memory register for application thereto of the predetermined program in question, as by actuating the master control panel section program select key, placing the controller in a special function mode to condition it for setting in its manual programming mode, by actuating the master control panel special function key, then actuating the master control panel section manual programming key to set the controller in its manual programming mode, and communicating to the controller the indicated predetermined program, in a program step by step sequence, by first actuating the master control panel section program step key, and then actuating the status panel sections, which for the first program step permits manual setting of the individual I/O function switches that are push button controlled by the keys of the indicated status panel sections, and in accordance with the computer data word arrangement thereof, for the first step of the indicated predetermined program, entering such first step of the indicated program into the memory register by again actuating the master control panel section program step key, repeating the last mentioned controller communicating and entering steps for each consecutive step of the indicated predetermined program, for entering such steps, computer word manner, consecutively into the controller memory register and consecutively following the first step of such program, and returning the controller to manual operation mode to check the program just entered or enter further programs.

As indicated, the basic processing of the system also calls for procedures for erasing programs that are in the memory map site at which the program in question is to be applied, and also modifying or revising the memory inserted program in question, and stepping the controller through same to check its accuracy of application. Further the user can enter a program into memory without the program being applied to one of the system work sheets, as where the user knows the method involved well enough to not need the work sheet.

The controller is readily shifted into its other modes as needed under the circumstances of operation, or for further manual programming input of processes as outlined on the system work sheet or work sheets, as the needs of the situation require.

Other objects, uses, and advantages will be obvious or become apparent from a consideration of the following detailed description and the application drawings in which like reference numerals indicate like parts throughout the several views.

In the drawings:

FIG. 1 is a diagram illustrating the basic arrangement of the programmable controller system incorporating the basic features of the present invention;

FIG. 2 diagrammatically but more specifically illustrates the processor display that is indicated in FIG. 1, which shows in a conventional manner the program and step number that the processor is working with at any particular time during its operation, including the application of particular programs and the steps thereof into memory, manual programming input fashion, in accordance with the present invention;

FIG. 3 is a fragmental plan view of the controller master control panel section of the system basic control panel arrangement, with parts broken away, indicating the identity of the keyboard keys thereof and the location of the panel section light viewing windows that are respectively associated with the switch controlled by each key;

FIG. 4 diagrammatically illustrates the status panel sections of the controller control panel arrangement, with the panel sections shown being illustrated as applicable to the program outlined computer word fashion on the work sheet illustrated by FIGS. 7, 9A and 9B and being shown in a manner similar to the showing of FIG. 3;

FIG. 8 is a diagram illustrating the layout of a typical RAM memory bit receiving register that may be employed in the practice of the invention;

Figure 7:
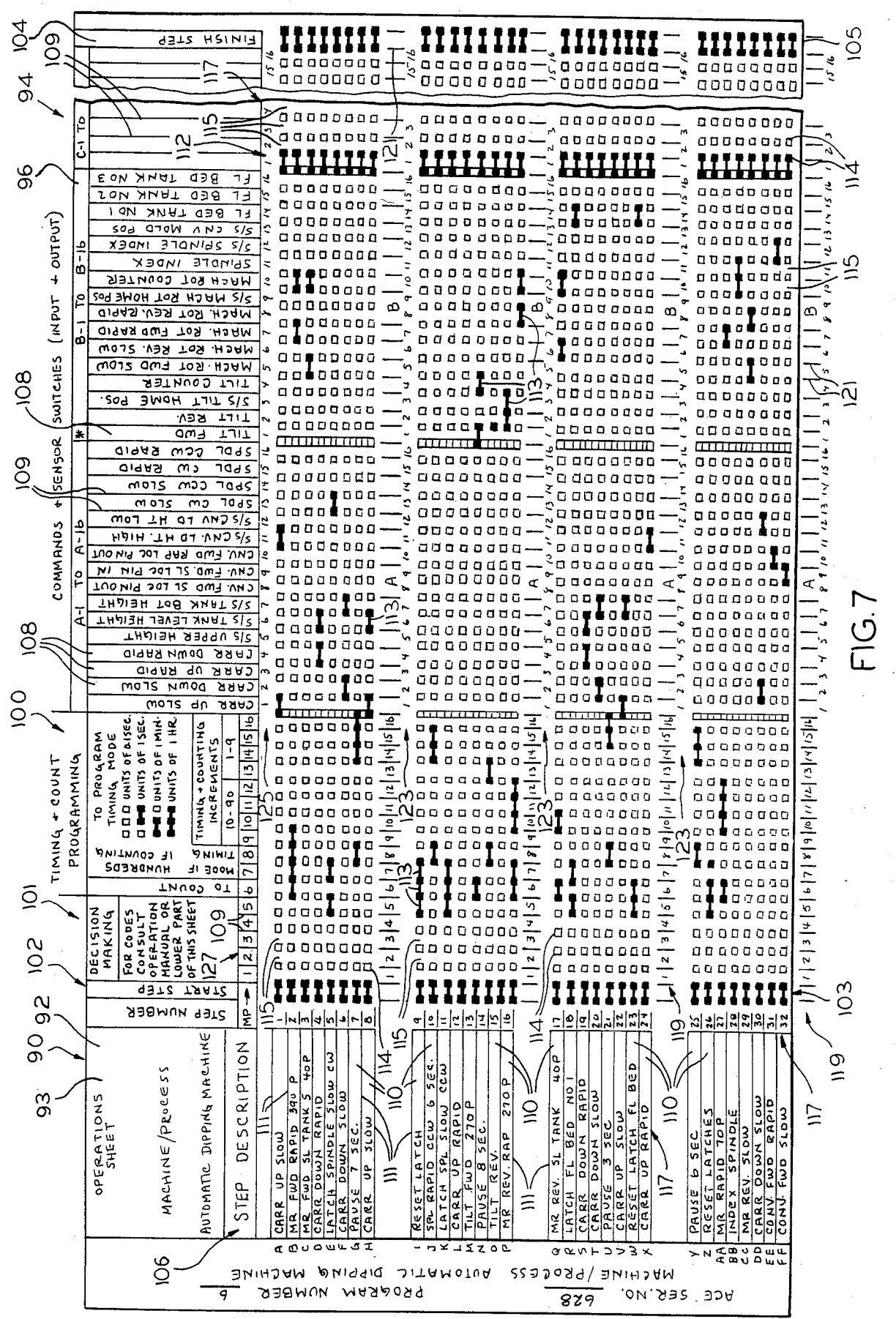
FIG. 7 illustrates the layout of a typical work sheet arranged in accordance with the practice of the invention, that illustrated containing computer word binary system fashion marking of a specific program for a series of steps for making molds using the investment casting mold forming machine that is diagrammatically illustrated in FIGS. 5 and 6.
Figure 9A:
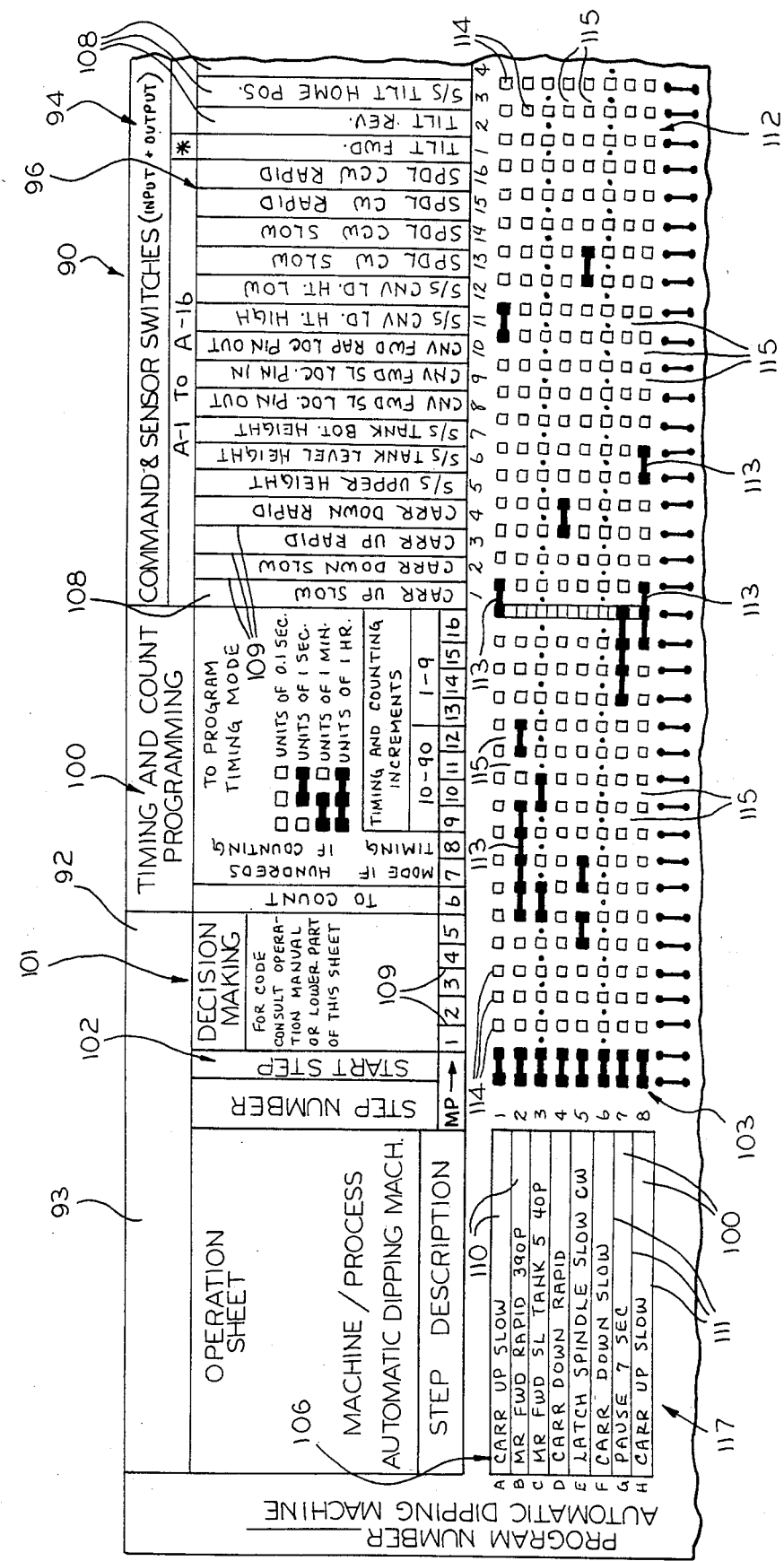
Figure 9B:
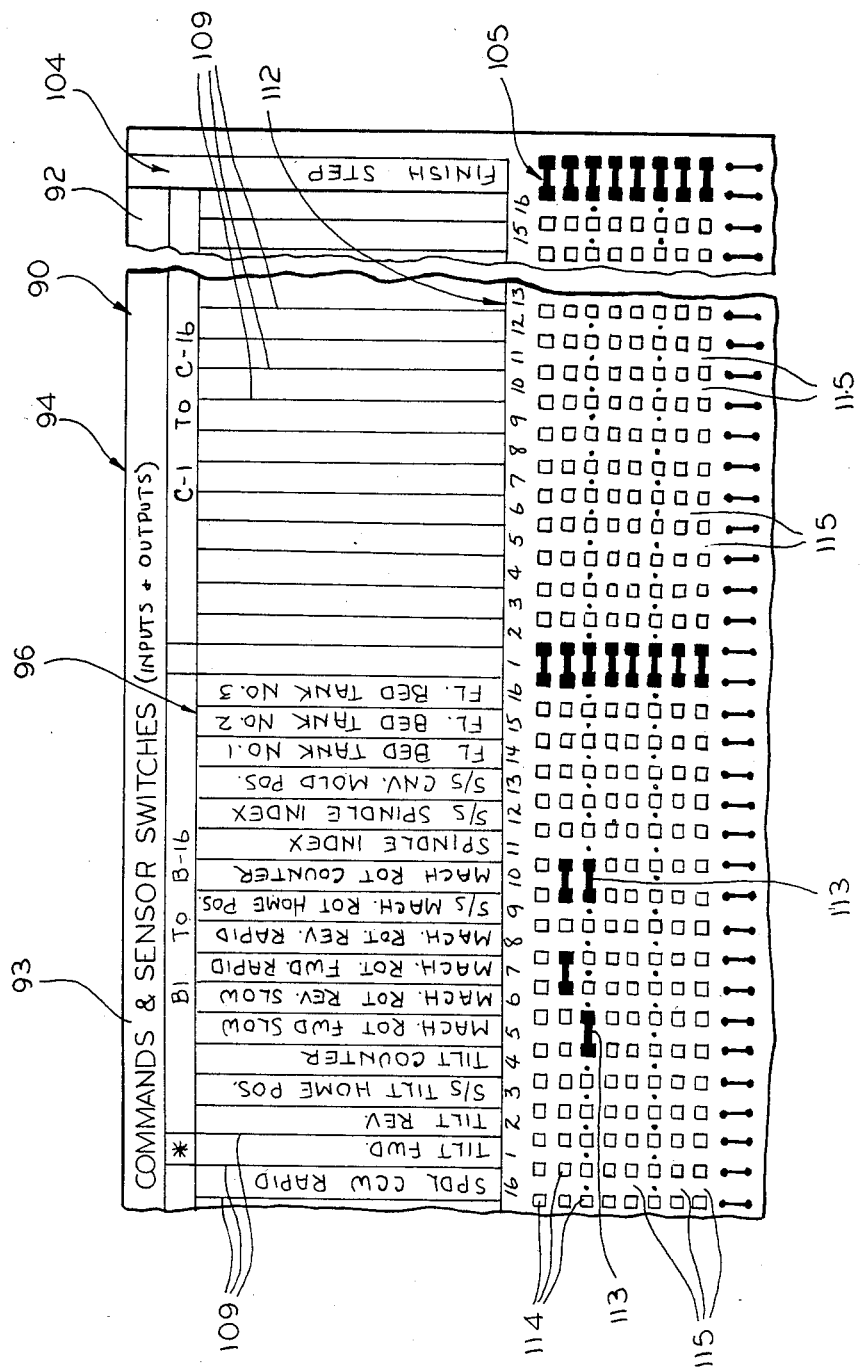

FIGS. 9A and 9B taken together are a fragmental view on an enlarged scale of the I/O function portion of the work sheet of FIG. 7 and the initial group of the program computer word format steps of same, to better show the relationship of the work sheet I/O and computer word forming zones.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL ARRANGEMENT

Reference numeral 10 of FIG. 1 indicates the general arrangement of a programmable controller in accordance with the present invention, of which the programmable controller comprises (as illustrated in block diagram form) the processor or central processing unit (CPU) 12 operated from a suitable control panel assembly 14 that provides the CPU control and program input facilities of the system, and having operably associated therewith a memory register assembly 16 which in the illustrated embodiment is of the byte oriented type. Also operably associated with the CPU 12 is tape reader 17 that is arranged in accordance with said U.S. Pat. No. 4,195,773, with the CPU 12 being connected by suitable means to the output and input modules shown in the form of input boards 18 and output boards 20; also associated with the CPU 12 is a display 19 for visually indicating by number the identification of the program and individual steps of same as they are being practiced or tested out by the operation of the controller.

In a practical embodiment of the invention, the CPU 12 may have, for instance, either a Zilog Z-80 microprocessor (Zilog, Inc.) or an Intel 8080 microprocessor, both of which are of the eight bit central processing unit type. The CPU 12 may be conventionally arranged to include a suitable combination of LSI chips along with IC's and suitable supporting electronic hardware. For instance, the CPU may comprise Zilog LSI chips that include a CPU chip for automatic program operation capability, an I/O chip for input and output control capability, and a CTC chip for timing and counting capability, and the indicated conventional integrated circuits and supporting electronic hardware in a suitable operative arrangement in accordance with prior art practices.

The controller memory 16 conventionally includes the operating system software and user program storage; the operating system software is ordinarily entered in LSI chips such as ROM's, PROM's, EPROM's, or EEPROM's, these being Read Only Memory chips, although some EEPROM's can be both ROM and RAM, depending on which ones and how they are used. The Operating system software can also be in RAM chips, entered into RAM of the CPU from, e. g., a magnetic tape or disc memory drive. However, ordinarily the operating system software would function only in the read mode regardless of how it was originally entered and the type of chips it was entered in.

The preferred arrangement for the practice of the invention (which is also the least expensive arrangement) involves ROM, PROM, or EPROM chips with the operating system software being entered into the chips as part of completing such arrangement. These chips are non-volatile (meaning the software is not lost with power failure). User program memory storage is normally RAM (Random ACCESS Memory) chips, which are Read/Write. Some EEPROM chips can be used as RAM. Sequential access type memories such as disc, magnetic tape, and bubble memory may be employed but are not preferred because generally they are much slower and more expensive. The user program storage section of memory must have extra capacity beyond that used for just program storage. This extra is for storage of information used in normal operation of programs, such as a map of which I/O's are inputs, which are outputs, which inputs are involved in decision making steps, and other housekeeping chores. Decision making conventionally is a function of the operating system software as created for a specific hardware system.

The control and program input panel assembly 14 in the practice of this invention comprises a master control panel sections 11, and one or more status control panel section (the number of which for any particular system is determined by the number of I/O's in the system, and the number of I/O's assigned to each status panel), three such sections being indicated in the illustrated embodiment at 13A, 13B, and 13C. The nature of the control panel sections involved will be referred to in detail as the disclosure proceeds, it being a feature of the present invention that the master control panel section 11 and the status control panel sections 13A, 13B, and 13C are all switchboard assemblies of the membrane or keyboard, touch sensitive, switch type, as will be made clear hereinafter. The assembly 14 in accordance with the invention provides a control and program input for the CPU or processor 12 that affords manually actuated mode and mode phase operation, and user programming, control for the system user.

It is assumed that power is supplied to the CPU 12 in any suitable manner, and that the input and output modules, as represented by input boards 18 and output boards 20, respectively, are appropriately connected to the CPU 12 and the processing machinery involved in any conventional manner. The CPU 12 is sometimes hereinafter referred to as the processor.

As is conventional, automatic operation of user programs entered into RAM is controlled by the memory operating system software when the processor 12 is in its automatic mode; the operating system software and connections between the CPU and display 19 are arranged conventionally to provide the program number and step number identification that is described hereinafter. It is also assumed that the RAM memory register included in memory assembly 16 is provided for entry into same and deletion therefrom of selected programs, that when the controller is in automatic operation the programs entered into RAM are controlled by the RAM memory automatically in a suitable conventional manner, and that the memory assembly involved and the connections between same, its RAM section, the processor, and display 19 are arranged conventionally to provide the program number and step number identification that is described hereinafter.

It is further assumed that the memory assembly 16 is of any suitable design to accept programs into memory, there being a number of ways to use memory for program storing. In the memory assembly 16, for purposes of explanation it is assumed that the memory provided is of the type that receives the programs step by step, in sequence for each program, with successive programs being consecutively entered regardless of the program number given each. The memory operating system software functions conventionally to put the proper program number on each program entered, and retrieve the program accordingly when such number is moved to display 19. Where a program is removed, actually what happens is that all of the programs entered into memory after the program to be deleted are shifted forward until they are adjacent or next to the program that was entered into memory before the program to be deleted (which thus forms a front or forward boundary for the latter).

Figure 6:
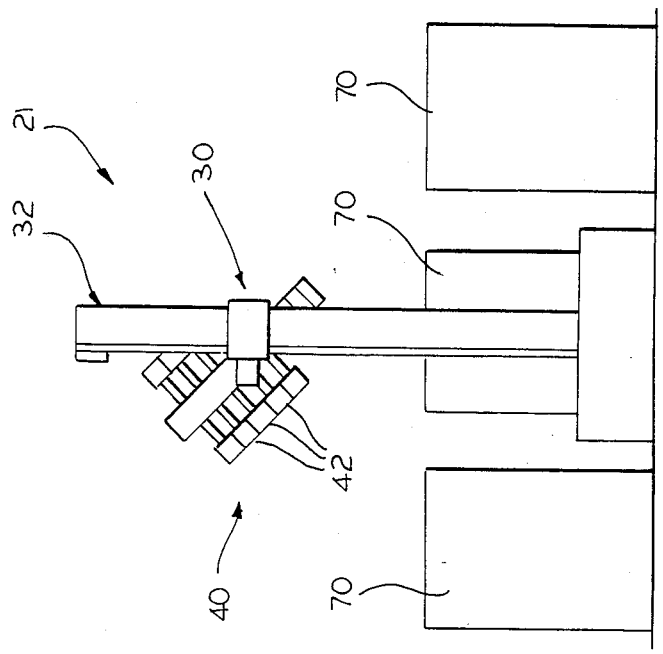
FIGS. 5 and 6 are diagrammatic side elevational views illustrating the general arrangement of an investment casting mold forming machine, the operation of which is controlled by the practice of this invention, and a program of operation of which is applied computer word fashion to the work sheet of FIGS. 7, 9A and 9B.

For purposes of this disclosure, it is also assumed that the programmable controller 10 is to control the operation of a manipulating dipping machine for making investment casting molds, the general arrangement of which appears in said U.S. Pat. No. 4,195,773, and which is also illustrated in FIGS. 5 and 6 of the present application, wherein the mold forming machine 21 is shown to comprise a manipulative arm 22 having a base section 23 and a projection section 24 equipped with a clamping head 26 adapted to be secured to a cluster 40 of mold forming patterns consisting of a number of normally but not necessarily identical patterns 42 which are suitably secured to a sprue form 44 that includes a suitable adapter for securement of the cluster 40 to the clamping head 26.

The manipulative arm base section 23 is connected to a trolley 30 movable (by a suitable drive means) up and down a vertical post 32. Post 32 is mounted for rotation about its longitudinal axis (that is vertically disposed) as indicated by arrow 34. The manipulative arm base section 23 is connected to the trolley 30 for rotation about a horizontal axis to swing the cluster 40 in a vertical plane (see FIG. 6), and between the upright position shown in FIG. 5, when the manipulative arm sections 23 and 24 are in coplanar relation with the post 32, and angled or inverted positions illustrated by the showing of FIG. 6 (360 degree rotation is provided for). Provision is also made to rotate or spin cluster 40 about the axis of sprue form 44, in any suitable manner, when the cluster 40 is suspended from the arm 22, as in the full line position of FIG. 5.

Figure 5:
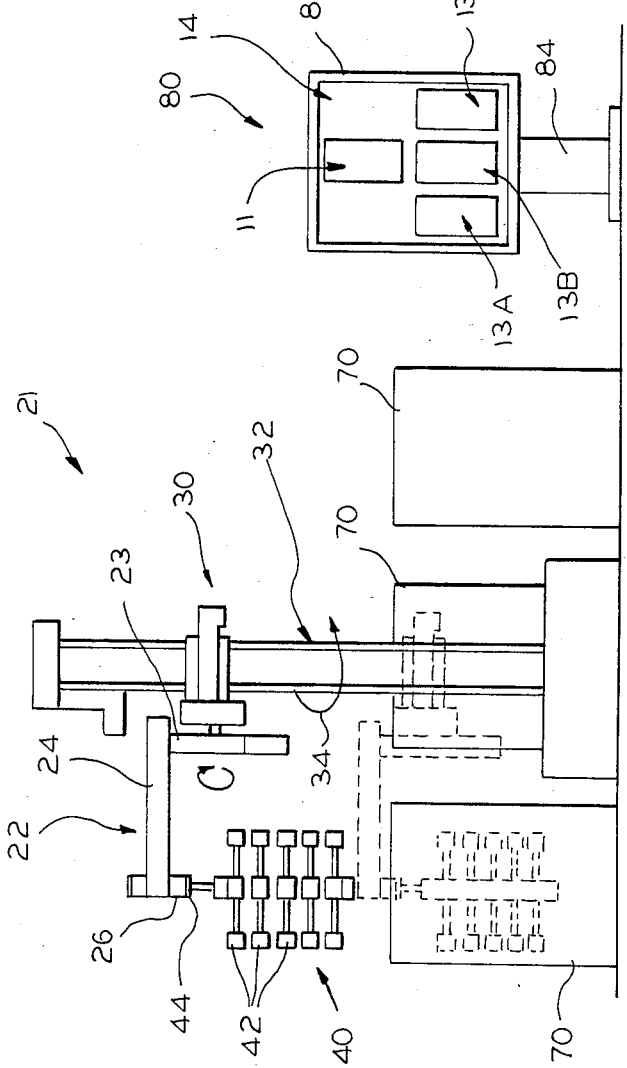

The dipping machine 21 is arranged to make investment casting molds by employing a dipping procedure, in accordance with which the cluster 40 of patterns 42 is suspended from the manipulative arm 22 utilizing the clamping head 26, as indicated in FIG. 5. The manipulative arm 22 is moved vertically of and circumferentially about the post 32 between a plurality of tanks 70 disposed about same so as to take the mold cluster 40 through a series of dipping operations into and out of the respective tanks 70 as part of the predetermined procedure or method for forming the individual molds about the patterns of the pattern cluster 40. When the final dipping step has been completed, the apparatus 21 moves to a predetermined "start-finish" position for removal of the completed mold cluster 40 and application thereto of a fresh pattern cluster.

Operably associated with the machine 21 is a programmable controller 80 that is arranged in accordance with the present invention and includes the components shown in diagrammatic block diagram form in FIG. 1. In the form shown in FIGS. 5 and 6, suitable housing 82 mounted on pedestal 84 encloses the programmable controller 10; the controller panel assembly 14, its master control panel section 11, and its status panel sections 13A, 13B and 13C are diagrammatically illustrated.

The machine 21 having been designed to go through a series of manipulative steps in processing the mold clusters to be handled by same, it follows that the operative parts of the machine 21 may be controlled by a programmable controller to follow a predetermined series of sequential operational steps to fully process the individual mold clusters.

Following the practice of the invention disclosed in said U.S. Pat. No. 4,195,773, the various inputs and outputs for controlling the operation of the machine 21 are itemized, and the sequence of their operation related to the various individual sequential movements of the manipulative arm that are to take place (which would be the individual consecutive steps that the machine 21 goes through in processing the individual mold clusters from start to finish).

With this information at hand, one or more work sheets 90 having the format and layout arrangement indicated in FIG. 7 are prepared for use as programming tools in using the controller 10.

The work sheet 90 is similar to those disclosed in said Ogden U.S. Pat. No. 4,195,773, and comprises a suitable substrate 92 that is formed or delineated on one side or face 93 of same to define across the top of same a control zone 94 having an input and output (I/O) subzone 96, a timing or counting subzone 100, and a decision subzone 101. Control zone 94 is interposed between the spaced apart vertically disposed tape locator columns or zones 102 and 104 that are adjacent either end of the work sheet (note that in the showing of FIG. 7 a portion of the work sheet adjacent its right hand end is broken away with only the extreme right hand end of same at that end of the work sheet being illustrated to facilitate illustration).

Work sheet 90 is also formed to define or delineate a step zone 106 that extends across the height of the work sheet at the left hand end of the substrate 92.

The work sheet 90 is further delineated to define in the control zone 94 a plurality of vertical columns 108 that in the form of work sheet 90 illustrated serve as sight guides intended to be phantom projected to the lower edge of the work sheet 90, while the step zone 106 provides a plurality of horizontal channels 110 that are intended to serve as sight guides to be phantom projected across the length of the work sheet to the right hand edge of same, and in intersecting phantom sight guide relation with the columns 108 as so projected, for proper orientation and organizing of the work sheet data bits in accordance with the invention of my said U.S. Pat. No. 4,195,773. In the work sheet 90 that is illustrated, columns 108 in I/O subzone 96 are formed by vertical or upright lines 109, while channels 110 in the step zone 106 are defined by horizontal or crosswise lines 111.

Thus the sight guides provided by the columns 108 and channels 110 provide imaginary guide lines that project across the work sheet computer word zone 112, wherein the so projected intersecting portions of the sight guides provided by columns 108 and channels 110 define a plurality of data bit receiving blanks that in the specific work sheet 90 of FIGS. 7, 9A and 9B are represented by blank or empty squares 114, and that are adapted to be manually marked in accordance with the practice of the invention.

In utilizing the work sheet 90, the inputs and outputs (I/Os) involved in a particular program are listed across the input and output subzone 96 in the manner suggested in FIGS. 7, 9A and 9B, while the consecutive steps to be sequentially followed in operating the apparatus controlled by the program in question are listed in the consecutive channels 110 within the step zone 106. Thus, each input and output is assigned a vertical column 108, while each step of the process to be controlled is assigned a channel 110. While the process steps must be listed in the sequential order that they occur in, the listing of the inputs and outputs need not be in any particular order, though the actual wiring connections of the I/O's must correspond to the order in which the I/O's are listed on work sheet 90.

The time and counting subzone 100 in the form shown is concerned with providing controlling data that has to do with the duration of the program when the program is put into operation and the number of times a particular action is to happen. The decision subzone 101 may provide for decision making steps, which are those that include a jump, a call, or an interrupt to another location in the program (or a different program), depending on the occurrence or non-occurrence of programmed events. This aspect of the system will be determined in light of known technology on this subject by the nature of the machinery to be controlled by the type and nature of the process involved.

The work sheet tape locator zones 102 and 104 preferably have formed in same for each channel 110 the respective indicia 103 and 105 that are to indicate the ends of the respective computer words that are to be formed by the horizontal sight guides provided by the channels 110 across the length of the work sheet, and by the manually marking of the work sheet longitudinally of same, as will now be discussed.

With the work sheet 90 delineated in the manner indicated, and the machine operator or other technician having in mind the steps to be performed in the process, the sequence of the steps, the inputs and outputs involved, and other control features that may be necessary or desirable, including the aforementioned timing, counting, and decisions, the operator can manually mark the work sheet 90, in the area of the blank squares 114, as indicated, using the binary notation system, when something is to happen. In the work sheet 90 that is illustrated, a pencil or ink mark 113, or the like, drawn between an adjacent pair of blank squares 114 and bridging a column 108 sight guide area (see FIGS. 9A and 9B) marks the I/O function of the corresponding column 108 (as shown in the subzone 96) to be actuated, and the corresponding portion of the work sheet for timing, counting, and decisions, is marked the same way. Thus, a data bit blank 115 is disposed between each adjacent pair of squares 114 of any sight guide projected channel 110, which is either left blank or is crossed by a line drawn between the indicated adjacent pair of blank squares 114, as shown in FIGS. 7, 9A and 9B.

Assuming that the data bit blanks 115 that are left blank across a sight guide projection column 108 mean nothing is to happen, and that such spaces 115 are suitably marked (as by line 113 drawn across same joining the pair of blank squares 114 on either side of same) indicate that some control action is to be taken (which is comparable to the "zero" and the "one" of the binary system), the machine operator or other technician having determined what is to happen with reference to the various machinery components being controlled during the operation of the method, can mark the appropriate data bit blank spaces 115 accordingly. In the work sheet 90 that is illustrated, a pair of squares 114 on either side of a site guide projection column 108 are joined by a pencil or ink mark 113 or the like to fill in the data bit blank 115 therebetween (as already indicated), which would otherwise be blank. In the timing, counting, and decision zones 100 and 101, such pencil or ink marks 113 similarly mark, where needed as determined by the program involved, and specifically the steps of same, the individual spaces 115 between adjacent squares 114 so that the marking on the work sheet for both the inputs and outputs and the timing, counting and decisions is of the same type across the length of the work sheet. Squares 114 of each computer word defining a processing step are thus equally spaced apart in the respective channels 110 (as projected); in columns 108 as projected, the squares 114 are aligned with column forming lines 109, in the illustrated sheet 90.

In accordance with the invention of said Ogden U.S. Pat. No. 4,195,773, the portions of the sight guide projected channels 110 between the tape locator zones 102 and 104 define computer word areas or channels that are coextensive with the summation of the data bit blanks 115 lying in each of the respective sight guide projected channels 110. With the sight guide projected channels 110 marked as indicated for a particular program the data bit information of the respective sight guide projected channels 110 as represented by the blank or marked data bit spaces 115, in summation thus comprise the computer word data for each step of the process being controlled. It is an important aspect of the general arrangement involved that as the data bits involved for each process step have been oriented in computer word form, the computer words for each step may be transferred from a work sheet into the processor memory without requiring ladder diagram technology or the like.

In accordance with the present invention, the tape and tape reader of said Ogden U.S. Pat. No. 4,195,773 is not required either.

As disclosed in said Ogden U.S. Pat. No. 4,195,773, the computer words defined by the work sheet 90 may be manually formed on a tape (not shown but fully disclosed in several forms in said Ogden U.S. Pat. No. 4,195,773) for passing through a suitably equipped tape reader that will sense the computer words the processor memory in preparation for operation of the controller. Reference may be had to said U.S. Pat. No. 4,195,773 for a disclosure of several types of tapes and tape readers that may be employed that are consistent with the objectives of that invention. The basic idea involved in each type of tape and tape reader is that each tape is formed to define a plurality of longitudinally extending channels that are proportioned laterally of the tape to be aligned or centered with each sight guide projected channels 110 of the work sheet 90. The number of such channels employed in a particular tape may be as desired, depending on the particular type of processor equipment employed. Since eight bit equipment has been suggested, the tapes as arranged for use with such equipment should have at least eight of such channels and be sufficiently wide to provide for application thereto of synchronization markings or their equivalent for proper timing relation with the tape reader employed.

In any event, in accordance with the invention of said U.S. Pat. No. 4,195,773, the computer words of the work sheet 90 are transferred to a tape arranged in accordance with the invention by manually marking the tape to reflect the data markings and the computer word end indicia, on the tape, for each computer word involved. This is done in practice by taking one end of the tape (which is to be the leading end of the tape) and marking it manually to show the location of the computer word indicia for the first eight channels 110 of the work sheet 90, and the manual markings of the areas 115 contained therein. This being completed, the computer words of the first eight steps of the process have been applied to the tape leading end. Then the next adjacent portion of the tape is marked in like manner with the next set of eight steps of the work sheet in like manner, and so on, until the computer words of all the process steps of the program have been applied to the tape.

This completes the preparation of the tape. When the controller is to be programmed using the tape, the tape is passed through the reader to effect insertion of the program now outlined on the tape into the controller memory to form the controller data base, with the individual computer words of the respective process steps in sequential orientation, and the individual groups of eight computer words of the process steps in consecutive series or serial relation.

The work sheet 90 that is illustrated in FIGS. 7, 9A and 9B is similar to the improved work sheet in FIG. 22 of said U.S. Pat. No. 4,195,773 to assist in applying the tapes to the work sheet, with the computer word zone 112 having its sight guide projected channels 110 subdivided in channel groups 117 of eight such channels (since eight bit equipment is illustrated) with the eighth channel 110 of each group 117 having added below same, and above the channel group 117 following it, a supplemental channel 119 that has synchronization lines or markings 121 applied thereto that correspond to the location of the tape synchronization markings (not shown). Work sheet 90 between each channel group 117 includes a single channel 123 providing consecutive number indicia for number identification of the inputs and outputs for each group 117, which are numbered corresponding to the numbers of the inputs and outputs of the sight guide projected columns 108 (indicated at 125) and the corresponding portions of the subzones 100 and 101. In the form shown the number identification of the timing, counting, and decisions controls is in between the respective synchronization markings 121, and is all applied as at 127 at the base of the subzones 100 and 101.

FIG. 8 is provided to diagrammatically illustrate the relation between the location of the computer word oriented data bits as defined by the spaces 115 on the work sheet 94 and the corresponding location of the same data involved in the RAM memory register, to facilitate an understanding of the method aspects of the present invention that are concerned with the push button entry of programs directly into the memory using the master control panel section 11 and the status control panel sections 13A, 13B, etc. in junction with the display 19.

In the showing of FIGS. 7, 9A and 9B, while a portion of the work sheet 90 is omitted, as already indicated, a full sized sheet involved may be delineated to define eighty data bit receiving spaces 115 across the sight guide projected columns 108 and the corresponding portions of subzone 100 and 101, to provide a computer word length of 80 equal subdivisions which are represented by five groups of numbers 1–16 along the bases of the subzones 96, 100 and 101; subzones 100 and 101 have one group of the resulting computer word subdivisions of 16 bits and subzone 96 has the remainder of the indicated groups of the resulting computer word subdivisions (of 16 bits each). The length of the sheet will depend on the number of I/O's involved in a particular program, and at present it is contemplated that program systems in accordance with the invention may involve as many as 128 I/O's, requiring 144 data bits and eight status panels of the type illustrated in FIG. 4.

The numerically numbered steps in the step column of work sheet step zone 106 are shown consecutively lettered to designate, for instance, step channels 1–8 of work sheet 90 and step channels A–H. Thus, in the showing of FIG. 7, at the left hand end of the work sheet 90, the alphabetical letters involved represent the corresponding computer words of the respective steps 1–8, while the numbered locations of the control zone 94, indicated by the five groups of numbers 1–16 at the base of zone 94, indicate the corresponding locations of the inputs and outputs and other categories of the zone 94 of the work sheet 90. Similar remarks apply to the next set 117 of the process steps 9–16 which are represented by the alphabetical letters I–B starting the said next computer work section of work sheet 90. Similarly letters Q–X designate the next group 117 of computer words, etc. Thus, each group 117 of computer words formed on the work sheet 90 may be considered to be subdivided into subdivisions corresponding to the locations of the data bit areas 115 of the work sheet 90 and appropriately identified by the markings indicated in FIG. 7. For instance, for the program step 1, which is designated as step A in the showing of FIG. 7, the first four subdivisions of the work sheet in its sight guide projected channel 110 for step A may be considered subdivided as A1, A2, A3, A4, etc. The other sight guide projected channels 110 of the work sheet 90, for subsequent steps of the program, may be considered similarly subdivided as B1, B2, B3, B4; C1, C2; C3, C4, etc., for the full eighty spaces of each computer word length involved (of course, the length of the computer word in any practical application of the invention may be greater or less than that illustrated, as will be clear to those skilled in the art, depending on the industrial process to be operated and the methods prescribed for same, as will be clear to those skilled in the art).

Further, and in accordance with the present invention, the inputs and outputs of each computer word formed on the work sheet are organized by further subdivision into subdivisions corresponding to the locations of the control zone 94 indicated by the five groups of control zone numbers 1–16 at the base of same. Thus, the first group is formed by subzones 100 and 101, and since these zones are for timing, counting, and decisions, the data bits corresponding to the locations of the spaces 115 involved may be designated TCD-1, TCD-2, TCD-3, etc. As part of the arrangement of the present invention, inputs and outputs represented by the four remaining groups of numbers 1–16 are designated group A, group B, group C, etc., with the specific program of sheet 90 having inputs and outputs limited to groups A and B because of the specific nature of the program prescribed for the equipment illustrated in FIGS. 5 and 6. Thus, the control zone of group A has data bits corresponding to locations 115 at locations A1, A2, A3, up to A16, with the data bits 115 of group B being similarly identifiable (see FIGS. 9A and 9B).

As made clear hereinafter, the status panel sections 13A, 13B, 13C of the control panel arrangement are provided to permit and provide for, as accommodated by operator action on the master control panel section 11, manual entry into memory of the computer words for each program step, and manual entry of entire process programs, by push button operator action on the status panel sections, as will be described. The "operator" or "program user" referred to, in this connection, is the individual operating the controller 10, who may be the operator of the processing machine controlled thereby or other technician who need not be trained in ladder diagram programming, but who will be generally familiar with the functions the processing machine involved is to perform.

Referring back again to the showing of FIG. 8, with the imaginary cross grid involved (in the work sheet 90) in mind, the location of any data bit marking at an area 115 of the work sheet 90 may be appropriately correlated with the corresponding location of same in and on the tape employed (as disclosed in said U.S. Pat. No. 4,195,773) as well as in the user program memory register (RAM or its equivalent), which in part is diagrammatically illustrated at 230 in FIG. 8 for purposes of better understanding the present invention. The register 230 is shown diagrammatically in grid form to facilitate an understanding of the memory map of the register, indicating byte address, bit number (0–7), and word location (process step 1, process step 2, process step 3), as well as indicating the location of the particular data bits in the particular memory map. The section 232 of the memory grid between points 233 and 235 corresponds to the computer data word for step 1 or A of work sheet 90, the next section 234 of the grid 230 between points 235 and 237 represents the computer word location and subdivisions therefor for the second step or step B of the process and work sheet 90, etc. In the showing of FIG. 8, the date bit sites 115 of work sheet 90 are identified by number in their corresponding locations in the diagrammatic illustration of the memory register that is provided, as indicated by the partial numbering and letter designations employed in FIG. 8. Thus, at byte address zero, the bit 115 locations of the data bits TCD-1, TCD-2, and TCD-3 of sheet 90 are shown (in FIG. 8), as are the data bit 115 locations of data bit locations A-1, A-2, and A-3, at byte address two, etc.

Of course, the memory register 230 may be arranged to provide any desired number of data bit locations for the computer words involved, which ordinarily will depend on the number of inputs and outputs and other control items employed and designated in the zone 94 of the work sheet 90. Other state of the art memory storage or manage methods consistent with the practice of the invention may also be employed, such as Opcode or assembled code with I/O data, and the like, as will be apparent to those skilled in the art.

Figure 4:
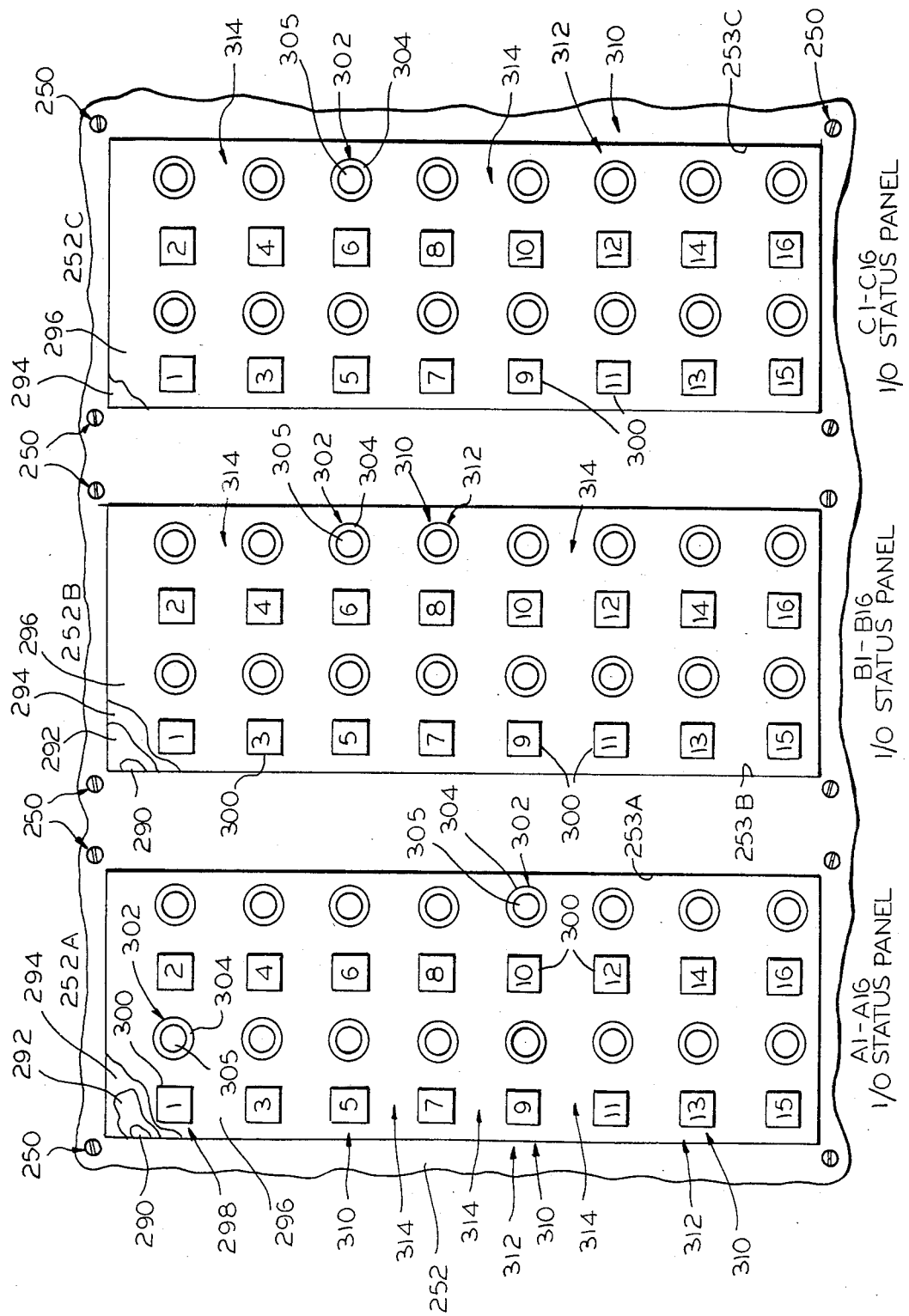

Referring now more specifically to FIGS. 1–4, and specifically with reference to the master control section 11 and the several status control panel sections 13A, 13B, and 13C, of control panel assembly 14, these panel sections are each of the type diagrammatically disclosed in said U.S. Pat. No. 4,347,416. Thus, the individual sections 11, 13A, 13B and 13C comprise a separate control panel arrangement of the membrane or keyboard switch type which comprises the structure shown in said U.S. Pat. No. 4,347,416, as, for instance, that shown in FIG. 1 of said patent including its circuit board 12, membrane sheet 14, legend sheet 16, cover sheet 18, and mounting plate 20, to which the assembled components of the control panel arrangement involved in each case are secured, as by employing suitable screw and nut assemblies 250. In the showings of FIGS. 3 and 4 of the instant application, the indicated mounting plate for the master control panel section 11 is indicated by reference numeral 252, and serves as the mounting for status panel sections 13A, 13B, and 13C, with the common mounting plate 252 being formed with the respective viewing apertures 253, 253A, 253B and 253C for the respective sections 11, 13A, 13B and 13C. The mounting plate 252 is assumed to be suitably applied to or be a part of the basic housing structure of the controller processor, and be located in a position to be readily observed by the controller operator, as in controller 80 of FIG. 5.

The circuit board employed for each panel section illustrated in FIGS. 3 and 4 may be arranged as disclosed in said U.S. Pat. No. 4,347,416, it being entirely conventional in nature and is arranged for membrane or keyboard touch sensitive, switch use. Such board of each panel section thus comprises a suitable substrate formed, for instance, from molded thermoset phenolic base or epoxy fiberglas base type materials, or the like, on which is formed the usual electrically conductive leads or traces that are connected, using conventional practices, with the electrically operated equipment that is to be controlled by the panel section involved. The circuit board type referred to as disclosed in said U.S. Pat. No. 4,347,416 has its electrical circuiting arranged to define a number of switch sets, each comprising contact components of the type disclosed in said U.S. Pat. No. 4,347,416 that are to be closed, membrane switch fashion, to energize an electric closed circuit that the switch set in question closes. Boards of this type commonly have electrical circuiting formed on both sides of same with leads extending to the ends of the boards for connection to other leads of the circuiting that the circuit board is associated with in any conventional fashion. The back side of the board for each switch is equipped with a suitable light emitting device, which is commonly a light emitting diode (LED) for each of the indicated switch sets, that is electrically connected to glow or emit light so as to be visible through circuit board windows or the like when the circuit the switch set is to control is electrically energized, unless some other suitable circuit energizing communicating arrangement is provided for, or is not needed or desired.

The membrane sheet, as disclosed in said U.S. Pat. No. 4,347,416, may be formed from Mylar polyester or the like of suitable thickness, and for each such switch set, the membrane is formed with an aperture to be aligned with the switch contact components of the switch involved, and a second aperture in the nature of a window to be aligned with the LED with which such switch set is associated. Membrane sheets of the type indicated are also equipped with an electrically conductive switch closing member that is to span the individual membrane apertures that are aligned with the switch contact components involved for closing such contacts and thereby complete the individual switches involved. Such switch member is conveniently made from a strip of stainless steel of film proportions, with such strip being bonded to the membrane sheet to overlie the respective switch exposing apertures, as suggested by the disclosure of said U.S. Pat. No. 4,347,416.

The legend sheet is what is viewed from the exterior of the control panel housing and is formed from transparent Mylar polyester or the like, and for each switch set involved, it bears a suitable switch identification indicia in the form of a quadrilateral or circular marginal line within which is centered suitable word, letter, or number indicia identifying the switch, or what it controls. The switch identification indicia involved customarily forms the "key" that is pressed to close the switch involved. For each such switch there is commonly located adjacent same a viewing window through which the LED or other suitable glow bulb of the switch may be observed when the switch is energized.

Overlying the indicated legend sheet is a protective transparent cover sheet that may also be formed from transparent Mylar polyester or the like.

In the master control panel section 11 of FIG. 3, the circuit board is fragmentally indicated at 256, the membrane sheet is fragmentally indicated at 258, the legend sheet that underlies the transparent cover sheet 260 is indicated at 262; the switch identification indicia for each switch is indicated by reference numerals 264, 266, 268, 270, 272, 274, 276, 278, and 280 with each such "key" having an associated LED viewing window having the same reference numeral with the suffix "A", where the function performed by the mechanism controlled by the key involved is consistent with a need for the operator to have a lighted LED to show that a particular function is "on". In each such case the window is defined by a ring 284 that encircles a light transmitting area 285 which may be uncoated; where an LED is employed as the light emitting source, the window for same may be colored appropriately to pass the light emitted thereby. Where the legend sheet is a matt surface polycarbonate, the cover sheet 260 may be omitted.

In the case of the status panel sections illustrated in FIG. 4, the fragmentally illustrated circuit board is indicated by reference numeral 290, the membrane sheet is indicated by reference numeral 292, the legend sheet is indicated by reference numeral 294, and this of course underlines the transparent cover sheet 296 in the status panel sections that are illustrated; the switch identification indicia 298 of each switch comprises a quadrilateral marginal line 300 within which is centered an identifying numeral indicating the switch number involved. As indicated in FIG. 4, each status panel section has 16 such switches associated therewith, and the switch identification indicia involved with each forms a separate "key" for actuating the switch involved. Associated with each such switch and to the right of same on the status panel involved is the associated viewing window 302 defined by a ring 304 that encircles a light transmitting area 305, which window is of the same character as suggested in connection with the master control panel 11. Again, where the legend sheet 294 is a matt surface polycarbonate, the cover sheet 296 may be omitted.

As disclosed in said U.S. Pat. No. 4,347,416, the switch keys and their viewing windows are all formed on the legend sheet 16 by suitable opaque material such as a suitable ink that may be applied thereto by practicing a suitable silk screening procedure satisfactory for this purpose.

As further disclosed in said U.S. Pat. No. 4,347,416, the status panel sections of FIG. 4 are arranged to organize the location of the respective switch sets, their LEDs, the viewing apertures and windows (as the case may be) in modular form, in which the individual modules 310 are columnarily arranged in spaced apart relation across the length of the control panel section involved. As illustrated, each module 310 is of bipartite form, and includes two of the switches involved and their associated windows 302, in a row 312 across the width of the control panel section involved, though obviously each module 310 could include additional such sets, depending on the specific design of the control panel section involved. As further disclosed in said U.S. Pat. No. 4,347,416, the individual module rows 312 are spaced apart along the length of the control panel section involved to provide a blank space 314 there between to receive the individual labels that are disclosed in said U.S. Pat. No. 4,347,716.

Assuming that the programmable controller arrangement 10 that is illustrated is to operate the mold forming machine 21 of FIGS. 5 and 6 in accordance with the program outlined on the work sheet of FIG. 7, the switches represented by the various keys of the master control panel section 11 and the separate status control panels 13A and 13B are electrically connected with the processor 12 to serve as individual operator input sensors for operator manual communication with the processor 12, in accordance with suitable practices and procedures employed in this field by those skilled in these arts, in light of the desired functions, purposes, and controls to be effected, and as outlined hereinafter.

In the case of the master control panel section 11, the switches of same represented by the respective keys illustrated are individually connected in accordance with standard practices to provide the hereinafter described mode and mode phase functions involved in controlling the processor 12. Thus, the output power key 264 is to shut "off" and "on" the output power that is to be made available to the output boards 20 via the processor 12 when the outputs are enabled; the key 266 is to place the processor 12 in its manual operation mode; the key 268 is to place the processor 12 in its automatic operation mode; and the key 270 is to place the processor 12 in its tape reading mode for inserting into the RAM section of memory assembly 16 the program of the work sheet 90 by way of using the tape that is disclosed in said U.S. Pat. No. 4,195,773 and for placing the processor in its program deleting phase of its tape reading mode that deletes from memory (RAM) the entire program that has previously put into memory using said tape; actuation of key 270 also turns off output power (by way of software, conventional wiring, connections, etc.).

The special function key 274 and the switch it controls, which is state of the art electrically connected to the processor 12 for these purposes, switches the processor off its manual operating mode and conditions it for placing it in its manual programming mode. The connections, wiring, etc. to the processor 12 are also made such that the program select-manual program key 276 and the program step key 280, and the switches they control, have special dual functions when the processor 12 is in its indicated special function mode.

Thus, the program select-manual program key 276 and the switch it controls (which is state of the art electrically connected to the processor for these purposes), when actuated in the manual operating mode of the processor 12, sets the processor 12 in its program number select phase of its manual operating mode for consecutively presenting at display 19 (by repeated pressing of the key) the program numbers in RAM memory in terms of program number and step zero (0); the wiring and connections are made such in accordance with conventional practice that where the LED 276A of key 276 is not lighted at any particular memory program number (as for instance 5--0) showing on display 19, there is a program entered at that memory location (note legend at LED 276A).

Actuation of special function key 274 after the desired program number and its step zero are present at display 19, permits further actuation of key 276 to set the processor in its manual programming mode, resulting in the lighting of LED 276A (which indicates this result); the processor 12 is now conditioned for manual entry of new programs in the controller RAM memory or the manual revision of programs already entered in the controller RAM memory.

The program step key 280 and the switch it controls (which is state of the art electrically connected for these purposes) when actuated in the manual operating mode of the processor 12 advances the program one step (or one-half step, where time, counting and decisions are involved in a program step, as made clear hereinafter), and when actuated when the processor 12 is in its manual programming mode, causes entry of program data for a particular step or half step to be entered into memory (in terms of data bits 115 employing the status panel sections 13A-13C, as hereinafter described), and also advances the program in memory one step or half step (as the case may be) for setting the processor to receive in memory the data defining the program next step or half step, that is entered in the same manner. This procedure is repeated successively to enter the program step by step into RAM. Actuation of manual key 266 returns the processor 12 to its manual operating mode.

The TCD key 272 and the switch it controls (which is state of the art electrically connected for these purposes) when actuated is actuated in the processor manual programming mode for entering into memory program data dealing with time, counting, and decisions, and thus the arrangement is here concerned with such data as shown under subzones 100 and 101 of work sheet 90 in terms of data bits 115 for each program step, and employing the status panel section 13A for this purpose, as described hereinafter. Where TCD data for any program step is indicated by a data bit 115 this is entered via actuating the keys of status panel section 13A in accordance with the data bits 115 under subzones 100 and 101, and then actuating program step key 280 to enter such data into memory. The memory operating software is written to effect such entry by a program half step, and the remainder of the program step that deals with I/O functions being entered as the next half program step via operation of program step key 280 in the manner indicated.

Thus, when the processor 12 is in its manual operating mode, key 276 actuation effects presentation of program numbers at zero step at display 19, and key 280 actuation will advance the program one step without effect on data in memory. However, when the processor 12 is in its manual programming mode (achieve by consecutive actuation of keys 274 special function) and 276 after the processor 12 is in its manual operating mode, key 276 in providing the manual programming mode conditions the processor for manual entry into memory of programs, or alteration of programs already in memory. Key 280 actuation enters the data transmitted to the processor in step or half step form into memory and also advances the program one step or one-half step (where time, counting, and decision data are involved), with TCD key 272 actuation in the manual programming mode conditioning the processor 12 for manual entry into memory of such data, and subsequent key 280 actuation entering such data that has been transmitted to the processor 12 into memory with the half step program advance that has been referred to.

The program reset key 278 controls a switch that is conventionally electrically connected to the processor 12, so that when all steps of a program have been entered into RAM memory, actuation of key 278 takes the program back to step zero of same on display 19, whereby with repeated actuation of program step key 280, the program at the memory site in question may be stepped through, consecutively step by step, so that the entries into RAM memory for each step may be displayed on the LEDs of the status panel sections, to check same against the program as laid out on work sheet 90 (the windows 305 of the status panel section becoming illuminated for each mark 113 location on the work sheet, for each step). The action provided by the actuation of key 278 is built into the memory operating system software. The term "step zero" means access has been provided to the program designated, as it appears on the display 19, and provides a "rest" in front of memory space that has or is to have a program in which nothing happens. If the program in question is at step zero and the auto key 268 is actuated the controller goes to step one. If the controller is in its manual mode with step zero showing at display 19, actuation of program step key 280 advances the program to step one.

As the processor functions, as manually actuated by the program reset key 278 and the program step key 280 are visualized at display 19, by way of the state of the art electrical connections involved, no LEDs or their equivalent switch "on" indicating lights are provided or needed on control panel section 11 for these keys. The connections and wiring to provide these functions may be of any appropriate state of the art type.

The status panel sections 13A, 13B, and 13C are each arranged to have sixteen separate I/O switching functions, and the wiring connections of the switches of the individual status panel sections 13A and 13B (13C also if the method steps include I/O functions in excess of the thirty-two illustrated for the program of FIGS. 7, 9A and 9B) are arranged in a conventional manner to provide memory entering latching functions corresponding to the data bits 115 of work sheet 90, for each program step, with the numbering of the status panel section switches conditioning to the respective groups indicated by the I/O numbers at the base of I/O subzone 96, that is A-1 to A-16 for the first group (the corresponding switches being at status panel section 13A), B-1 to B-16 for the second group (with the corresponding switches being at status panel 13B), etc. as indicated in FIG. 4. The memory entry latching functions involved are what effect the operator induced sensing of the processor 12 in accordance with the invention. The number of status panel sections employed for any particular controller system will depend on the number of I/O's involved, and the number of I/O switch functions the individual status panel sections are to have.

In addition, the software and wiring connections of the switches for the status panel section 13A are arranged in a conventional manner to have the switches of this data panel serve the dual RAM memory entering latching functions of not only permitting the insertion into memory of the TCD functions of the program of sheet 90, but also the input and output functions for the first 16 data bits of the work sheet subzone 96, with the numbering of the switches of the status panel section 13A that is indicated in FIG. 4 corresponding to the numbers 1-16 I/Os or such first group (A-1 to A-16). This is effected by entering the TCD functions (where present) for any program step, as a half step (as already indicated), with the entry of the I/O functions of the rest of the program step being entered as a separate half step; the electrical connections and operating system, software of the processor memory and switches involved are state of the art arranged in any suitable manner to perform these functions.

The switches of status panel section 13B controlled by the keys thereof are electrically connected to the processor to provide for manual entry and change of the second I/O function group of sheet 90 (B-1 to B-16) with regard to the RAM memory, as hereinafter described, when the processor is in its manual programming mode phase. The status panel section 13C is not required and is not electrically connected in this embodiment since the program of work sheet 90 has its input and output requirements limited to the input and output and other function data bits represented by the first two groups of 16 of same. However, other programs may require one or more additional status panel sections, depending on the number of I/O functions involved in the machine or process to be controlled by the controller.

The memory entry latching functions involved in the manual use and operation of the status panels employed, in this instance status panels 13A and 13B are what effect transmittal of the data bits 115 involved to the processor for entry into memory.

Once the programmable controller arrangement is installed in association with the industrial processing equipment it controls, such as that indicated in FIGS. 5 and 6, the function of the individual switches involved in the status panel sections 13A and 13B (and 13C also where there are enough I/Os) will be known, and may be labeled in accordance with the practice of the invention of said U.S. Pat. No. 4,347,416. This labeling is not illustrated in FIG. 4 as the principles involved in this regard, for understanding of the present invention are fully shown in said U.S. Pat. No. 4,347,416.

In any event, with the controller 10 installed as indicated, the program work sheet 90 may be applied to the controller memory either by employing the tape and tape reader arrangement that are disclosed in said U.S. Pat. No. 4,195,773, or in accordance with present invention, whereby the program involved is manually programmed into memory using the panel sections 11, 13A and 13B as a terminal.

The controller display 19 is preferably in the form of a conventional display device providing a 7 segment LED display within the four viewing frames 315, shown at FIG. 2, which device is suitably electrically connected to the processor 12 to give the program number on the left hand side of the display and the step numbers of the program in the display frames to the right of the program number, as identified in FIG. 2. As is well known in the art, there are other devices that will also provide the same information when appropriately connected in accordance with standard practices in this field.

Should the operator wish to apply the program of work sheet 90 into the controller memory using the tape and tape reader approach of said U.S. Pat. No. 4,195,773, the tape is first prepared in accordance with said U.S. Pat. No. 4,195,773. The output power key 264 is disposed in its off position (off positions of such switches being indicated by lack of illumination in their respective viewing windows adjacent same), and the key for manual operation, 266 is pressed to close its switch, so that the LED involved is visible through viewing window 266A. The operator then presses the program select key 276 as needed to advance consecutively the program numbers, as viewed in display 19, until the desired program number of the corresponding RAM memory site appears in the display. This orients the controller memory for application to same of the indicated program at the RAM memory slot or site represented by the program number. Where no program is then at this site, the wiring of the switch control by key 276 is arranged such that the LED of viewing window 276A will be visible. The operator then presses the read tape key 270 which conditions the controller into its, read tape mode for receiving the program into memory by applying a tape bearing same through the tape reader (following the disclosure of said U.S. Pat. No. 4,195,773).

After application of the program to memory via the tape the controller may be returned to the appropriate program operating mode for effecting the type of control the operator wants over the industrial processing apparatus.

METHOD OF MANUAL INPUT OF WORK SHEET PROGRAMS INTO MEMORY USING CONTROL PANEL KEYS

The arrangement of the present invention provides for manual programming input into RAM memory of a program using the master control panel section 11 and the status panel sections 13A and 13B, independently of and without the need for the indicated tape and tape reader, and in some cases, without the need of a work sheet 90. The invention also contemplates that the same type of procedure can be used to make changes in programs already in memory. This arrangement contemplates, as has been indicated, that the switches and actuating keys therefor of the master control panel section 11 and the separate status control panels 13A and 13B (and other additional status control panels as needed depending on the number of I/Os involved), act as individual operator input sensors for operator manual communication with the processor 12, whereby the operator or user of the controller 10 has manually actuated, processor or CPU mode and mode phase operation and operator or user programming entry and change control, over the controller 10.

This is to be distinguished from prior art standard programmable controllers, which are equipped with a separate terminal for program entry purposes. These terminals are commonly more expensive than the programmable controller itself, they require highly trained personnel to operate, and as they are typically portable or mobile in character so as to be moved to the location of the programmable controller, they are subject to damage from transportation and storage. In order to use the terminal, it must be moved to the location of the programmable controller installation and hooked up with connectors. These controllers are arranged to automatically operate programs originally entered; where the system user has a need at any time for the operator to have manual control of any outputs (and almost all systems do require this), then external switches with external wiring and conduit must be provided, hard wired. Additional I/O's must be added to the system to cover these switches. Additional user programming must be prepared and entered into memory through the terminal.

The processor operator input sensing or manual input control represented by the manual input functions of panel section 11 and the separate status control panels 13A and 13B make processor control easy, reliable and inexpensive for anyone who is familiar with the functions or steps that a particular processor or machine is to perform.

The nature of the present invention will be evident from a description of how controller 10 is operated to receive and make operative the program of FIG. 7 that is suggested as a way of operating the apparatus of FIGS. 5 and 6.

The program of sheet 90 (FIGS. 7, 9A and 9B), as previously described, is drawn up to operate the apparatus of FIGS. 5 and 6, in accordance with a desired program, and in the example program illustrated, two of the tanks 70 are employed to apply the dip coating desired. It is assumed for purposes of description that the indicated program is to be applied to the controller memory 16 at the RAM memory as program No. 3. It is also assumed that a program with that number is already in the RAM memory.

In order to insert into the controller RAM memory the indicated program following the Applicant's manual programming procedures whereby the control panel sections 11, 13A and 13B are used as manual programming terminals, the controller must first be in its manual operating mode, which will be indicated by the lighting of the LED at window 266A; if the LED 266A is not lighted, the controller is placed in its manual operating mode by the operator pressing the manual key 266, which will then effect the lighting of the LED at its viewing window 266A. With the controller in its manual operating mode, the remainder of the switches of the panel section 11 will be off (except that controlling output power) as indicated by the unlighted condition of their viewing windows (LED 264A remains on), due to the state of the art wiring and electrical connection arrangement involved that has been referred to. The display 19 will show the RAM memory map slot or site at which the memory map is disposed at, and for purposes of explanation it is assumed that the display is 4--3, meaning that the controller is at step 3 of program 4.

In order to shift the controller as needed to bring program 3 at display 19, the program select key 276 is repeatedly pressed as needed, it sequentially presenting the individual programs by consecutive number on the display 19, as by program number and zero step indication, in effecting the program selecting phase of the processor manual mode. The state of the art wiring, software, and connections involved result in the first actuation of key 276 setting the display showing at 5--0, indicating program No. 5, step 0. The program select key is repeatedly pressed until the program numbers have started to repeat, and the number 3 program number and the step zero appears on the display as 3--0. Where the LED at the viewing window 276A is dark at this stage, it is indicated that there is a program at the memory slot or site represented by program number 3. In such case, the program in question is entirely "erased", in accordance with the invention, by then pressing the read tape key 270, with the wiring involved being such that the viewing window 266A for the manual key 266 will remain lighted, and thereafter the read tape key 270 is pressed again to "erase" the program at the indicated slot, with the system being such that at this stage the viewing window 266A will now be dark and the LED at window 276A will be on (showing that there is now no program at the memory slot or site in question). LED 270A will be lighted, indicating that the controller is in its tape reading mode.

The operator now presses the manual key 266 to return the controller to its manual operating mode; LED 266A will now be lighted and LED 270A will be off. This is followed by pressing the special function key (SF) 274, which sets the controller in its special function mode and thus preconditions the processor for placing it in its manual programming mode, with LED 274A now being lighted and LED 266A being off. This effects a display reading of 3--0; if output power was on in the manual operation mode, the system is state of the art made such that output power is disabled (it remaining so during manual input programming, with return of the processor 12 to manual operating mode permitting enabling of the output power by actuation of key 264).

This is followed by pressing the manual programming key (MP) 276 (the same key that controls the program select switch in manual operating mode) with the system being such that the processor 12 is thereby put into its manual programming input mode. The display 19 will again show the program number 3--0, with LED 276A now being lighted and indicating that the controller is in its manual input programming mode, and is set to receive the new program.

The operator then presses the program step key (PS) 280 with the display 19 now changing to show 3--1. At this point the operator has now conditioned the processor to enter the program of sheet 90 into the controller memory, and the switches of status panel sections 13A and 13B are in latching mode; this is the program entry phase of the manual programming input mode. He goes to step 1 as it appears on sheet 90 and noting that there are no program entries in the first sixteen (the TCD) positions (that form a half step for program manual entry purposes), but there are several in the second group of sixteen positions, the keys for switches A-1 and A-11 (that form the other half step), the keys of status panel section 13A for switches 1 and 11 of that panel section are actuated to turn such switches on, as indicated by the showing of their associated LEDs through the viewing windows 302 for these switches (A-1 and A-11). In this program entry condition the switches controlled by the status panel sections shown at FIG. 4 are in their latching modes, as indicated, so if the wrong switch is pressed, this can be corrected by merely pressing the key therefor again to turn off the LED thereof, and then pressing the right key for the right switch. The PS key 280 is then pressed to actuate the switch controlled thereby, the connections of which are state of the art and software arranged to transfer the data bits represented by the condition of the switches at status panels 13A and 13B into memory binary notation fashion, with the display changing to 3--2, and with the LED of the switches A-1 and A-11 being turned off to join the rest of the turned off LEDs. Thus, for step 1 of program 3, the process step computer word involved has zero notation for the location of all the status panel section switches except the switches designated A-1 and A-11 in FIGS. 7, 9A and 9B by the manual marking of the program step one on work sheet 90; the computer word involved at the location of switches A-1 and A-11 has the opposite "one" marking.

The operator then goes to step 2 of the program, which as indicated by FIGS. 7, 9A and 9B, includes program entries in the timing, counting and decision (TCD) half step. The operator to place this half step in memory presses the timing, counting and decision (TCD) key 272 which in the processor manual programming mode effects the turning on of the switch controlled thereby, which effects the lighting of the LED of same as is exposed at viewing window 272A. Noting that in process step No. 2, at the timing, counting and decision half step portion of same, it is the switches 6–9 and 12 (see FIG. 9A) that are to be actuated the corresponding switch numbers of status panel section 13A are turned on by pressing the corresponding keys which turns on the LEDs of the corresponding switches involved that will thus be visible through the viewing windows associated with the switches involved. The PS key 280 is then pressed to close the program step switch which enters into memory the data bit information represented by the TCD portion or half step of the second program step, and also turns off the LEDs of the respective switches involved. The display will remain at 3--2 due to the processor software state of the art arrangement involved, which, as indicated hereinbefore results in the processor on this mode and phase acting separately for both I/O programming and TCD function memory entry (where TCD functions are called for). The remainder of the second program step is then applied to memory, and this involves actuating the keys of switches Nos. 7 and 10 of status panel section 13B to close same (the program of sheet 90 (see FIGS. 9A and 9B) showing no switch actuations for status panel section 13A). The LEDs of these indicated closed switches will then be on, and this is followed by again pressing the program step key 280 that transfers the data bit information involved for the remainder of the second program step into memory. As indicated, the memory will have a "1" for each switch that is turned on, as indicated by the LED indicators for same, and the other data bits for the step computer word will be "0". Again, when the controller is in its manual programming input mode, the status panel switches are in their latching modes, so that if an incorrect switch is turned on, as indicated by the LED therefor, again pressing the key for that switch will turn it off and the proper switch key can then be pressed to close the desired switch.

The remainder of the steps of this program are entered in the same manner. It may be noted in this connection that other steps of the program include decision timing and counting steps, and that, as indicated, these half steps are entered separately using status panel section 13A.

After all steps of the program have been entered into memory, the manual key 266 is actuated to close its switch and terminate the manual programming mode of the processor, and return the processor it to solely its manual operating mode, and thus to energize the manual LED and deenergize as well all LEDs on the status panel sections 13A and 13B. The display 19 will now read 3--32, which is the number of steps in the program that is laid out on work sheet 90.

The program as entered into memory can be checked while the controller remains in its manual mode by sequentially pressing the program reset key 278 to return the program just entered into memory back to zero step, after which the program step key 280 is pressed to advance the program a step at a time to check it against the program steps as laid out on the work sheet 90. In so doing, the LEDs of the switches of the status panels 13A and 13B will light up in accordance with their previous settings that were made to get the data bit information involved in each computer word as represented by manual markings of work sheet 90, into the controller memory. Should there be an error, the special function key 274 is actuated to terminate the manual operating mode of the processor and condition it for placing in its manual programming mode, which turns on the LED involved for viewing at its window 274A (the LED viewed at window 266A will now be off). The manual programming key 276 is then actuated to set the processor in its manual programming mode and the setting of the status panel switches (as indicated by their LED's) for the step involved can then be made or redone correctly in accordance with the work sheet; actuating of the program step key 280 effects placing the corrected step data bits into memory at the memory location for such program step (or half step, as the case may be) after which the manual key 266 is pressed to set the controller for further step by check of the program in the manner just described. After entry into memory and checking of the programs in the manner indicated, the controller may be operated in the usual manner to practice the programs so entered into memory as and when needed for production purposes.

It will thus be seen that the invention provides for use by the controller operator at the master control panel section 11 a push button control that places the controller in a manual programming input mode that permits entry into the controller RAM memory of the steps of a program of a work sheet 90 by way of key actuation, as by finger pressing, the switches of the status panel sections (that will give the LED lighting indicated for the corresponding switch numbers involved in the work sheet program for each step involved in the program). The panel sections 11 and 13A, 13B, etc. provide for manually effected terminal entry of desired programs into memory, as an alternate to using the tape and tape reader implements and procedures of U.S. Pat. No. 4,195,773. As each step is entered into memory by actuation of program step key, the program is automatically advanced to the next step for entry of the next step or half step into memory in the manner described.

Thus, the need to have the tape and tape reader associated with the controller is avoided if so desired. The work sheet 90 is also not necessary where the program is simple and the operator is sufficiently familiar with the program step needs to be able to operate the panel sections 11 and 13A–13C without the guidance of a work sheet 90.

Further, a program that is already in memory may be changed by stepping the controller to the step to be changed and manually entering the revision in the controller manual programming input.

It is to be noted that the specific program of FIGS. 7, 9A and 9B is supplied primarily to illustrate the principles of the invention, and that the invention is broadly applicable to all industrial processing methods of the type suitable for operation by controllers of the type represented by controller 10 and their similarly equipped equivalents.

While the switches employed in the control panel assembly 14 are preferably of the disclosed membrane or keyboard switch type, toggle or any other kind of normally open switch having momentarily closing action effecting characteristics may also be employed, though the disclosed membrane or keyboard switch type is considered the best mode for the practice of the invention.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. The method of programming a programmable controller system for controlling an industrial process, in which the system includes a central processing unit, operating system software and user program memory storage means for said unit means for entering and storing binary notation system fashion program defining computer data bits in the memory storage means, circuit means for operatively connecting the industrial process I/O devices to said unit, control panel means including means for setting said unit to operate in manual and automatic modes, respectively, a work sheet delineated to define on its working face a series of vertical columns to which the process inputs and outputs of the industrial process are respectively assigned and a series of horizontal channels consecutively listing the steps of the process in operational sequence, with said columns and said channels intersecting to form individual work sheet data bit receiving blank areas for selectively receiving manual entry marks binary notation system faashion indicating I/O device functions for each step of said process in accordance with a predetermined program of operation for said process, and with said channels each having computer data word end indicia at either end of same between which said blank areas are disposed to form for each channel a computer data word space of the same predetermined length, means for manually marking said work sheet word spaces binary rotation system fashion to indicate I/O device function for each step in the process in accordance with the predetermined program of operation for said process to provide the computer data word for each step of said process, with the circuit means for operatively connecting the I/O devices to said unit comprising one or more status panel keyboard means integrated with said control panel means and including for each such I/O function separate key means and visible off-on signal means therefor, respectively, for controlling the individual I/O switches and electrically connected to provide and indicate visually on said status panel means the status of said I/O device function for any one step of a program in binary notation system oriented computer word arrangement in accordance with any such program of operation, and with the memory means having a memory map for accepting programs designated by program number, and including master keyboard panel means including keys for setting said unit in manual and automatic modes, respectively, said master, keyboard panel means also including and operable when said unit is in its manual mode, a program select key for locating a desired program slot site of said memory map by program number, a manual programming key for setting said unit for changing the program entries in said memory means, a program step key for setting said unit to accept into the memory means in a step by step manner the predetermined program transmitted to said unit via said status panel keyboard means for changing the memory means program entries, key means for advancing any selected program entered into said memory means step by step from step one thereof for reviewing visually on said status panel means the status of the program I/O functions entered in said memory means for each such program step, and means for displaying the program number and step identities of programs of the memory means, the method of entering such predetermined program into the memory means when the control keyboard panel is operated to place said unit in its manual mode, including the steps of:

locating in the memory means map the desired site thereof, for said predetermined program by actuating said program select key, conditioning said unit for changing the program entries in said memory means by setting said unit to accept into the memory means such predetermined program at the site located by the practice of said locating step, setting said individual I/O switches in accordance with the binary notation system fashion oriented computer data word arrangement thereof for the first step of said such predetermined program as shown on said work sheet by manually actuating as needed the respective I/O key means of said status panels keyboard means for transmitting such first step computer data word to said unit, entering said first step of said such predetermined program into the memory means at said located site by actuating said program step key, repeating the last mentioned I/O switch setting and entering steps for each consecutive step of said such predetermined program for entering same consecutively into said memory means following consecutively said first step of said predetermined program, and returning said unit to said manual operation mode.

2. The method set forth in claim 1 including:

erasing, after said locating step and prior to said conditioning step, any program previously entered into the memory means map at the desired site.

3. The method set forth in claim 1 including:

actuating said display means to show the program and step identities at the memory map site being processed at each step of claim 1.

4. The method set forth in claim 1 wherein:

said such program entered into said memory means by said method is revised by the steps of, when the master control keyboard is operated to place said unit in its said manual mode, locating in the memory means said site of said such predetermined program by actuating said program select key, conditioning said unit for changing the program entries in said memory means by setting said unit to accept into the memory means at the site located by the practice of said locating step the revised program, setting said individual I/O switches in accordance with the computer data word arrangement thereof for the first step of said such revised program as shown on said work sheet by manually actuating as needed the respective I/O key means of said status panels keyboard means for transmitting such first step computer data word to said unit, entering said first step of said such revised program into the memory means at said located site by actuating said program step key, repeating the last mentioned I/O switch setting and entering step for each consecutive step of said such revised predetermined program for entering same consecutively into said memory means following consecutively said first step thereof, and returning said unit to said manual operation mode.

5. The method set forth in claim 4 including:

actuating said display means to show the program and step identities at the memory means site being processed at each step of claim 4.

6. The method set forth in claim 1 including:

checking the program entered at the memory means site being processed for accuracy on a step by step basis for visually checking at said status panel means of the I/O functions entered into the memory means site for each said step of said program.

7. The method of manually programming a programmable controller system with a predetermined program of operation for controlling an industrial process, in which the predetermined program of operation defines each step of the process in terms of a computer data word that includes the I/O device functions for each such process step, and the system includes a central processing unit, operating system software and user program memory storage means for said unit, means for entering and storing binary notation program defining computer data bits in the memory storage means, circuit means for operatively connecting the process I/O devices to said unit including one or more input modules and one or more output modules, master control panel means including key means for setting said unit to operate in manual and automatic modes, respectively, with the circuit means for operatively connecting the I/O devices to said unit comprising one or more status panel keyboard means integrated with said control panel means and each including for each such I/O functions separate key means and visible off-on signal means therefor, respectively, for controlling the individual I/O switches and electrically connected to provide and indicate visually on said status panel means the status of said I/O device functions for any one step of a program in binary notation system oriented arrangement in accordance with any such program of operation, and with the memory means having a memory map for accepting programs designated by program number, and with the master control panel means further means including and operable when said unit is in its manual mode, a program select key means for locating a desired program slot site of said memory map by program number, a manual programming key means for setting said unit for changing the program entries in said memory means, a program step key for setting said unit to accept into the memory means in a step by step manner the predetermined program transmitted to said unit via said status panel keyboard means, for changing the memory means program entries, key means for setting any selected program entered into said memory means to zero step position and for, by actuating said program step, advancing any selected program entered into said memory means step by step for reviewing visually on said status panel means the status of the program I/O functions entered in said memory means for each such program step, and means for displaying the program and step identities of program sites of the memory means when such sites are the subject of program step entries, the method of user entering of such a predetermined program into the memory means when the master control panel means is operated to place said unit in its manual mode, including the steps of:

locating in the memory means the desired site thereof for said such predetermined program by actuating said program select key means, conditioning said unit for changing the program entries in said memory means by setting said unit to accept into the memory means such predetermined program at the site located by the practice of said locating step, setting said individual I/O switches in accordance with the computer data word arrangement thereof for the first step of said such predetermined program by manually actuating as needed the respective I/O key means of said status panels keyboard means for transmitting such first step computer data word to said unit, entering said first step of said such predetermined program into the memory means at said located site by actuating said program step key, repeating the last mentioned I/O switch setting and entering steps for each consecutive step of said such predetermined program for entering same consecutively into said memory means following consecutively said first step thereof, and returning said unit to said manual operation mode.

8. The method set forth in claim 7 including:

erasing, after said locating step and prior to said conditioning step, any program previously entered into the memory means at the desired site.

9. The method set forth in claim 7 including:

actuating said display means to show the program and step identities at the memory means site being processed at each step of claim 7.

10. The method set forth in claim 7 including:

revising said such program entered into the memory means by said method by the steps of, when the master control panel means is operated to place said unit in its said manual mode, locating on the memory means said site of said such predetermined program by actuating said program select key means, conditioning said unit for changing the program entries in said memory means by setting said unit to accept into the memory means at the site located by the practice of said locating step for the revised program, setting said individual I/O switches in accordance with the computer data word arrangement thereof, for the revised program, for the first step of said such revised program by manually actuating as needed the respective I/O key means of said status panels keyboard means for transmitting such first step computer data word to said unit, entering said first step of said such revised program into the memory means at said located site by actuating said program step key, repeating as needed by the program revisions being entered the last mentioned I/O switch setting and entering steps for each consecutive step of said such revised predetermined program for entering same consecutively into said memory means following consecutively said first step thereof, and returning said unit to said manual operation mode.

11. The method set forth in claim 10 including:
actuating said display means to show the program and step identities at the memory means site being processed at each step of claim 10.

12. The method set forth in claim 7 including:
checking the revised program entered at the memory site being processed for accuracy on a step by step basis for visually checking at said status panel means of the I/O functions entered into the memory site for each step of said revised program.

13. In a programmable controller system for controlling an industrial process, in which the system includes a central processing unit, operating system software and user program storage memory means for said unit for entering and storing binary notation system program defining computer data bits in computer word program step defining form in the memory means, circuit means for operatively connecting the industrial process I/O devices to said unit including one or more input modules and one or more output modules, control panel means including means for setting said unit to operate in manual and automatic modes, respectively, and means for displaying the program and step identities of program sites of the memory means when said unit is operating in one of said modes, the improvement wherein:

said control panel means comprises a master control panel section and one or more status control panel sections, with said master control panel section having finger operated operator input sensor means for operator manual communication with said unit for entry and revision of programs entered in said memory means including means for setting the memory means at a desired program site therein, means for conditioning said unit to receive at such memory means site a program entry in step by step form, and, in binary notation fashion step defining form for each such program, and means for returning said unit for process controlling in accordance with one of said modes when said programs have been entered into said memory means, said status control panel sections each including input sensor means for operator manual communication with said unit, when said unit is conditioned to receive one of the said programs at such memory means site, said input sensor means of said status control panel sections comprising a separate sensor device for each of said I/O devices and off-on indicating means therefor, and means for manually off-on actuating the respective sensor devices for manual entry of such program into said memory means, step by consecutive step of the program, using binary notation fashion program step defining computer mode data bit indicia, for each step of such program, so that for each step of such program said indicating means of said status panel sections, respectively, shows, binary notation system fashion, the I/O device functions to be activated for each such program step so entered in said memory means.

14. The improvement set forth in claim 13 including means for stepping said unit memory means site through such program after such program has been entered at said memory means site for visual checking of the accuracy of entry by observing said indicating means.

15. The improvement set forth in claim 13 wherein:
said displaying means includes means for displaying a program identification number of said program, and consecutively displaying the numbers of the steps thereof, as said program is entered into said memory means, and said program is thereafter stepped through for checking purposes.

16. The method of manually programming a programmable controller system with a predetermined program of operation for controlling an industrial process, in which the predetermined program of operation defines each step of the process in terms of a binary notation system fashion oriented computer data word that includes the I/O device functions for each such process step, and the system includes a central processing unit, operating system software and user program memory storage means for said unit, means for entering and storing binary notation fashion program step defining computer word data bits in the memory storage means, circuit means for operatively connecting the process I/O devices to said unit including one or more input modules and one or more output modules, control panel means including keyboard means for setting said unit to operate in manual and automatic modes, respectively, and with the memory means having a memory map for consecutively accepting such programs designated by program number and step thereof number, and means for displaying the program and step identities of program sites of the memory means when such sites are the subject of program step entries, the method of user entering of such a predetermined program into the memory means when the control panel keyboard means is operated to place said unit in its manual mode, including the steps of:

locating in the memory map the desired site thereof for said such predetermined program, conditioning said unit for changing the program entries in said memory means by setting said unit to accept into the memory map such predetermined program at the site located by the practice of said locating step, manually effecting transmittal to said unit, for application to said memory means at said memory step site, and as a whole the first step of said predetermined program in binary notation fashion data bit computer word form, manually effecting entry of the computer word comprising said first step of said such predetermined program into the memory means at said located site, repeating consecutively the manually effected transmittal and entry steps for each consecutive step of said such predetermined program for entering the computer word comprising same consecutively into the memory means following consecutively said first step thereof, and returning said unit to said manual operation mode.

17. The method set forth in claim 16 including:

actuating said display means to show the program and step identities of said predetermined program at the memory means site being processed at each step of claim 16.

18. The method set forth in claim 17 including:

checking said predetermined program entered at the memory means site being processed for accuracy on a step by step basis by consecutively establishing and viewing signals defining the consecutive computer words forming the consecutive steps of said predetermined program.

19. The method set forth in claim 16 wherein:

said such program entered into the memory means by said method is revised by the steps of, when control panel means is operated to place said unit in its said manual mode, locating on the memory map said site of said such predetermined program, conditioning said unit for changing the program entries in said memory means by setting said unit to accept into the memory map such program revisions at the site located by the practice of said locating step for the revised program, manually effecting transmittal to said unit, for application to said memory means at said memory means site, and as whole, a first revision of the first step of said predetermined program to be revised, and in binary notation fashion bit form, manually effecting entry of the computer word comprising the first consecutive step of said predetermined program to be revised, into the memory means, and at the step number of said revised step of said predetermined program, repeating consecutively the manually transmitted and entry steps of each subsequent steps of said predetermined program to be revised for revising said memory map to reflect such step revisions, and returning said unit to said manual operation mode.

20. The method set forth in claim 19 including:

actuating said display means to show the program and step identities of said predetermined program at the memory means site being processed at each step of claim 19.

21. The method set forth in claim 20 including:

checking the revised program entered at the memory site being processed for accuracy on a step by step basis by consecutively establishing and viewing signals defining the consecutive computer words forming the consecutive steps of the revised program for each step of said revised program.

* * * * *